(12) United States Patent
Hodgson et al.

(10) Patent No.: US 12,454,225 B2
(45) Date of Patent: Oct. 28, 2025

(54) VEHICLE INTERIOR COMPONENT

(71) Applicant: Shanghai Yanfeng Jinqiao Automotive Trim Systems Co. Ltd., Novi, MI (US)

(72) Inventors: Thomas Scott Hodgson, Holland, MI (US); Rick Alan Anderson, Grand Haven, MI (US); Andrew K. Ruiter, Grand Haven, MI (US); Adam R. Gofton, Holland, MI (US)

(73) Assignee: Shanghai Yanfeng Jinqiao Automotive Trim Systems Co. Ltd.

( * ) Notice: Subject to any disclaimer, the term of this patent is extended or adjusted under 35 U.S.C. 154(b) by 1023 days.

(21) Appl. No.: 17/454,482

(22) Filed: Nov. 10, 2021

(65) Prior Publication Data

US 2022/0063504 A1    Mar. 3, 2022

Related U.S. Application Data

(63) Continuation-in-part of application No. 16/700,488, filed on Dec. 2, 2019, now Pat. No. 11,220,197.
(Continued)

(51) Int. Cl.
*B60R 7/04*    (2006.01)
*B60N 2/75*    (2018.01)

(52) U.S. Cl.
CPC ............ *B60R 7/04* (2013.01); *B60N 2/793* (2018.02)

(58) Field of Classification Search
CPC ....... E05F 15/63; E05F 1/1253; E05F 1/1261; E05D 11/00; F16C 11/00; B60R 7/04;
(Continued)

(56) References Cited

U.S. PATENT DOCUMENTS

| 6,616,205 B2 | 9/2003 | Bruhnke et al. |
| 7,064,285 B2 | 6/2006 | Ichimaru |

(Continued)

FOREIGN PATENT DOCUMENTS

| CN | 204172791 U | 2/2015 |
| CN | 204184264 U | 3/2015 |

(Continued)

OTHER PUBLICATIONS

Translation DE-202017106909-U1.*
(Continued)

*Primary Examiner* — Amy R Weisberg
*Assistant Examiner* — Denise Lynne Esquivel
(74) *Attorney, Agent, or Firm* — Amin, Turocy & Watson, LLP

(57) ABSTRACT

A vehicle interior component is disclosed. The vehicle interior component may comprise a base providing a compartment, a cover movable relative to the base comprising a first door and a second door movable between closed and open positions, and a mechanism to couple the doors. The mechanism may provide an engaged state coupling movement of the doors and a disengaged state decoupling movement of the doors. The mechanism may comprise a first member and a second member that may extend and/or retract relative to the first member. At least one of the members may flex relative to the other. The mechanism may comprise a linkage. An effective length of the linkage may comprise a default length to couple movement of the doors and a non-default length to allow independent movement of one door. The component may comprise at least one of a console, a center console, a floor console.

20 Claims, 20 Drawing Sheets

Related U.S. Application Data which is a continuation of application No. PCT/US2019/047238, filed on Aug. 20, 2019.

(60) Provisional application No. 62/720,921, filed on Aug. 21, 2018.

(58) Field of Classification Search
CPC .............. B60R 7/14; B60R 2011/0007; B60R 2011/0014; B62D 65/14; B65D 43/267; B60N 2/75; B60N 2/793; B60N 3/10
USPC .... 296/37.8, 153, 24.34, 24.43, 24.46, 24.3, 296/24.4
See application file for complete search history.

(56) References Cited

U.S. PATENT DOCUMENTS

| | | |
|---|---|---|
| 7,407,200 B2 | 8/2008 | Ichimaru |
| 7,533,919 B2 | 5/2009 | Sauer |
| 8,740,265 B2 | 6/2014 | Gillis |
| 9,868,401 B2 | 1/2018 | Kodama et al. |
| 10,040,397 B1 | 8/2018 | Wuerthele et al. |
| 10,077,592 B1 | 9/2018 | Thorsell et al. |
| 10,150,422 B2 | 12/2018 | Ramaer et al. |
| 10,697,212 B2 | 6/2020 | Suzuki |
| 10,717,390 B2 | 7/2020 | Anderson et al. |
| 2005/0183940 A1 | 8/2005 | Ichimaru |
| 2010/0102061 A1 | 4/2010 | Hamaguchi |
| 2010/0156128 A1 | 6/2010 | Dexter et al. |
| 2010/0244478 A1 | 9/2010 | Depue |
| 2017/0036584 A1 | 2/2017 | Amick |
| 2017/0232902 A1 | 8/2017 | Keller et al. |
| 2020/0071984 A1 | 3/2020 | Fukui et al. |

FOREIGN PATENT DOCUMENTS

| | | | |
|---|---|---|---|
| CN | 105818754 A | 8/2016 | |
| CN | 105835733 A | 8/2016 | |
| CN | 108349438 A | 7/2018 | |
| DE | 10 2009 036 453 A1 | 4/2010 | |
| DE | 10 2009 036 454 A1 | 4/2010 | |
| DE | 102011079653 A1 | 1/2013 | |
| DE | 102012208275 A1 * | 11/2013 | ............ B60N 3/102 |
| DE | 10 2010 039 821 B4 | 5/2014 | |
| DE | 20 2010 018 274 U1 | 4/2015 | |
| DE | 10 2015 105 977 B3 | 5/2016 | |
| DE | 102016006138 A1 | 12/2016 | |
| DE | 10 2016 014 388 A1 | 6/2017 | |
| DE | 202017106909 U1 | 11/2017 | |
| DE | 10 2010 039 821 C5 | 3/2018 | |
| DE | 10 2017 100 055 A | 7/2018 | |
| JP | 3987969 B2 | 10/2007 | |
| JP | 4218225 B2 | 2/2009 | |
| JP | 4384078 B2 | 12/2009 | |
| JP | 2010100201 A | 5/2010 | |
| JP | 2010-163031 A | 7/2010 | |
| JP | 4619037 B2 | 1/2011 | |
| KR | 1998-0046544 A | 9/1998 | |
| KR | 10-0738305 B1 | 7/2007 | |
| KR | 20-2015-0003218 U | 8/2015 | |
| WO | 2017/174027 A1 | 10/2017 | |
| WO | 2020/041292 A1 | 2/2020 | |

OTHER PUBLICATIONS

International Search Report and Written Opinion for International Application No. PCT/US2019/047238 dated Oct. 18, 2019, 8 pages.
Notice of Allowance received for U.S. Appl. No. 16/700,488 dated Oct. 5, 2021, 30 pages.
Communication pursuant to Article 94(3) EPC received for E.P Patent Application Serial No. 19851883.9 dated Oct. 25, 2023, 2 pages.
Extended European Search Report received for E.P Patent Application Serial No. 21876502.2 dated Jul. 24, 2024, 8 pages.
Office Action issued for Chinese Application No. 201980054591.1 dated Jun. 6, 2023, 6 pages.
Extended European Search Report received for E.P Patent Application Serial No. 19851883.9 dated Mar. 21, 2022, 7 pages.

* cited by examiner

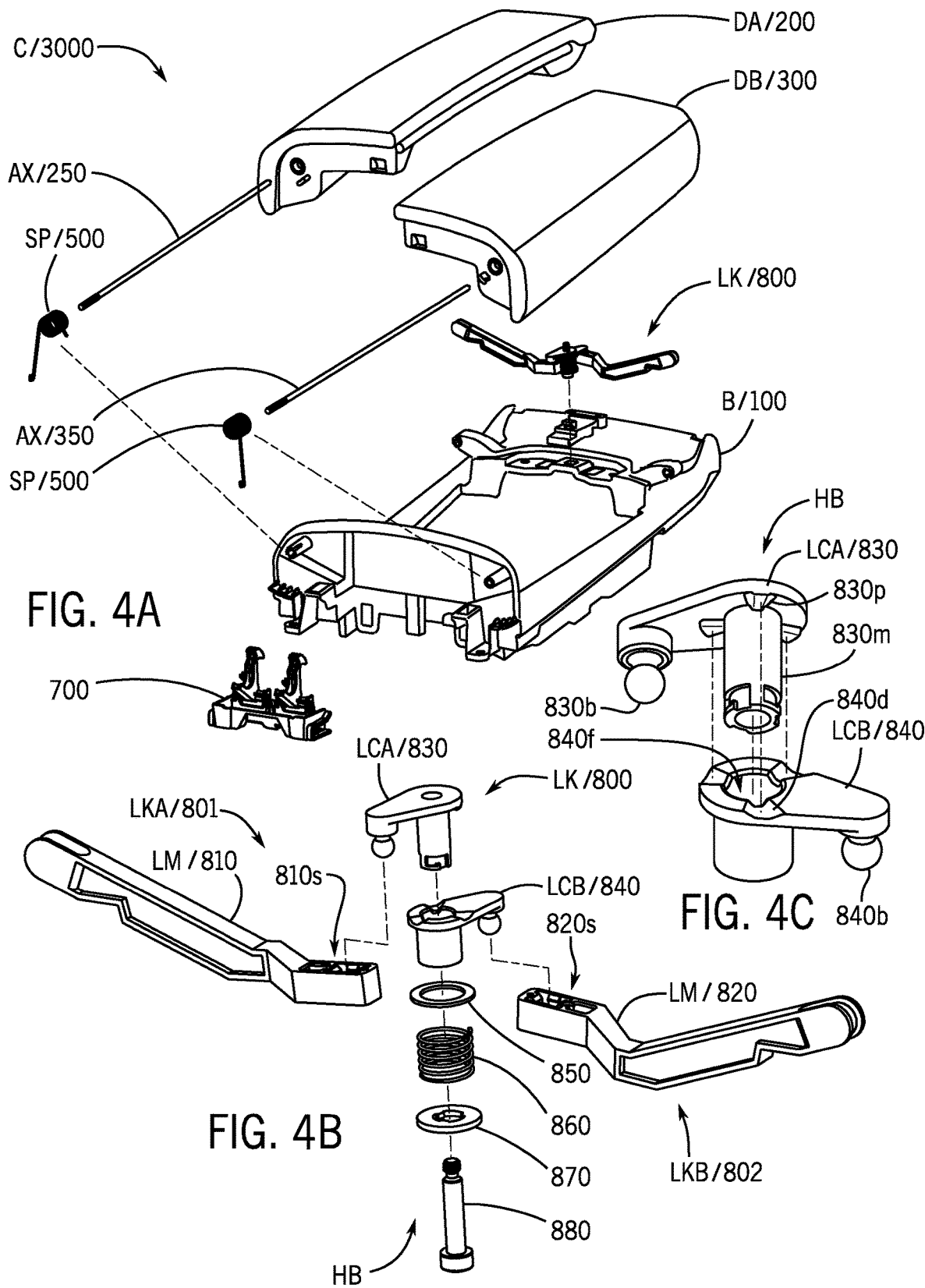

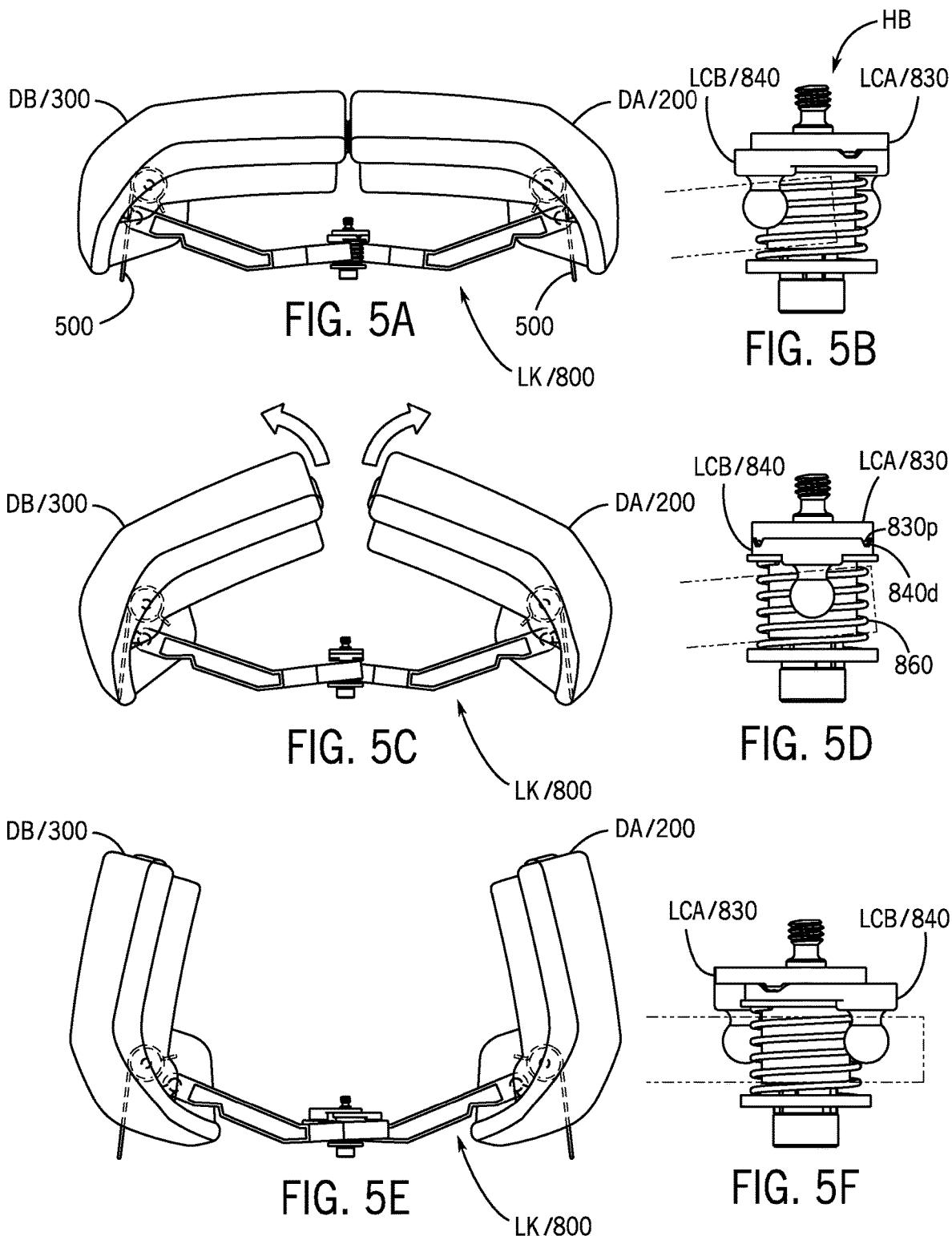

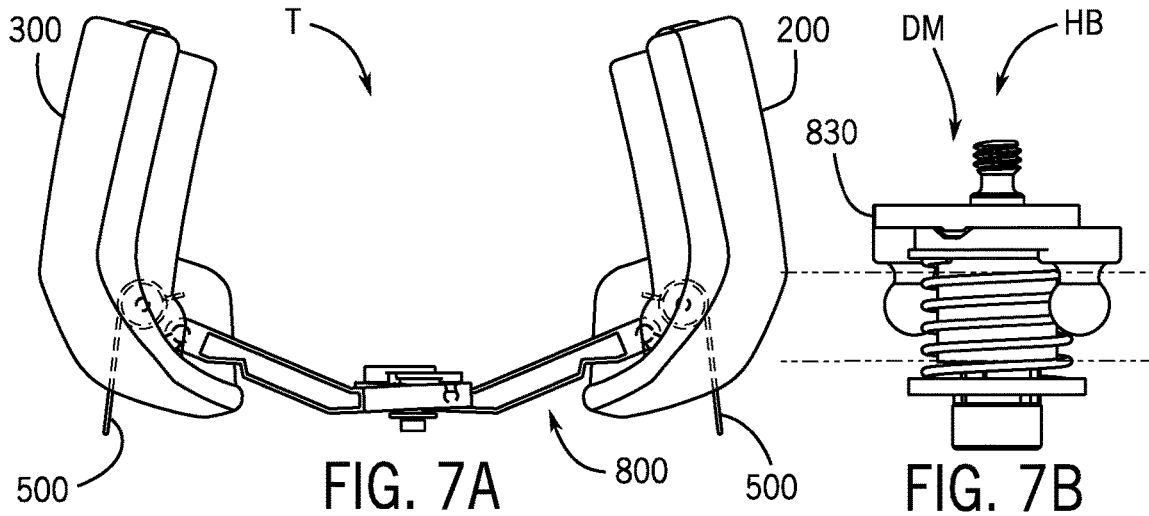
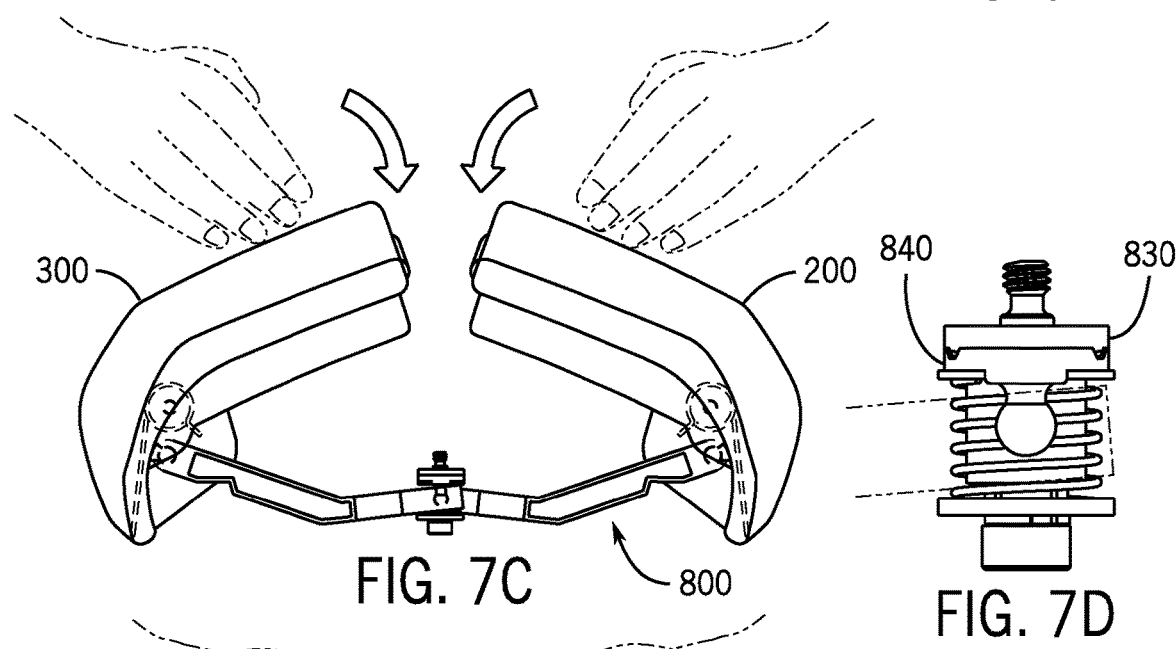
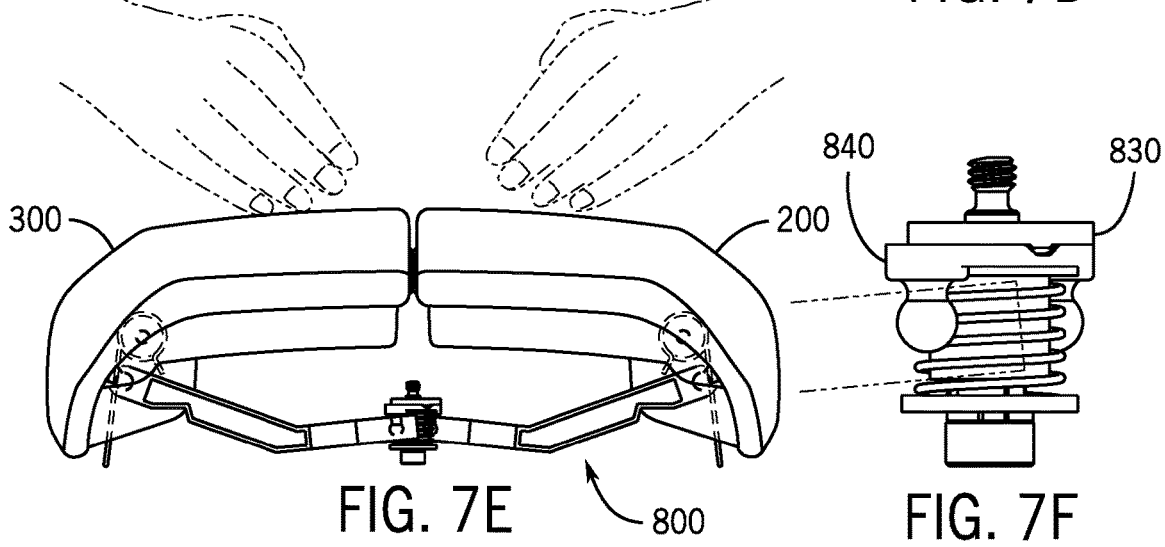

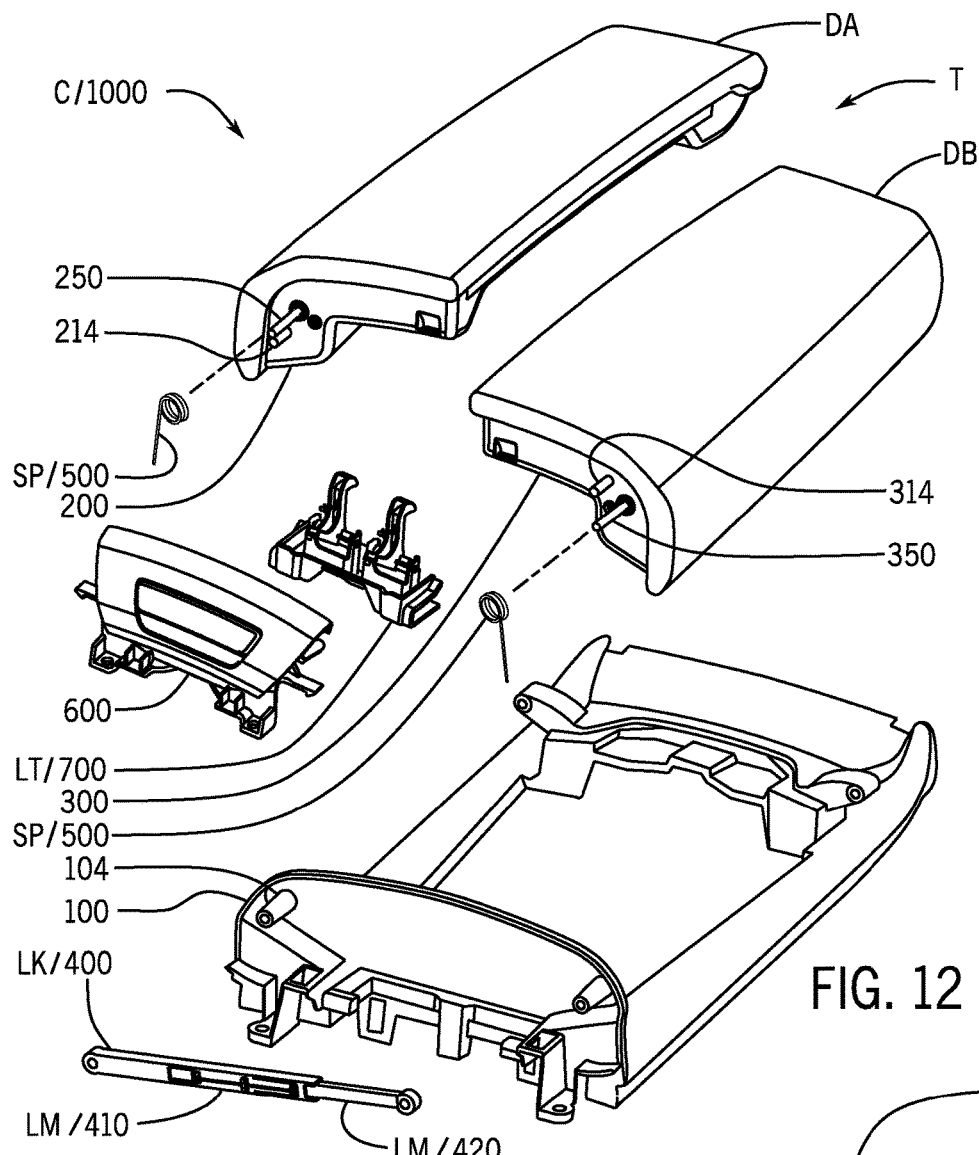
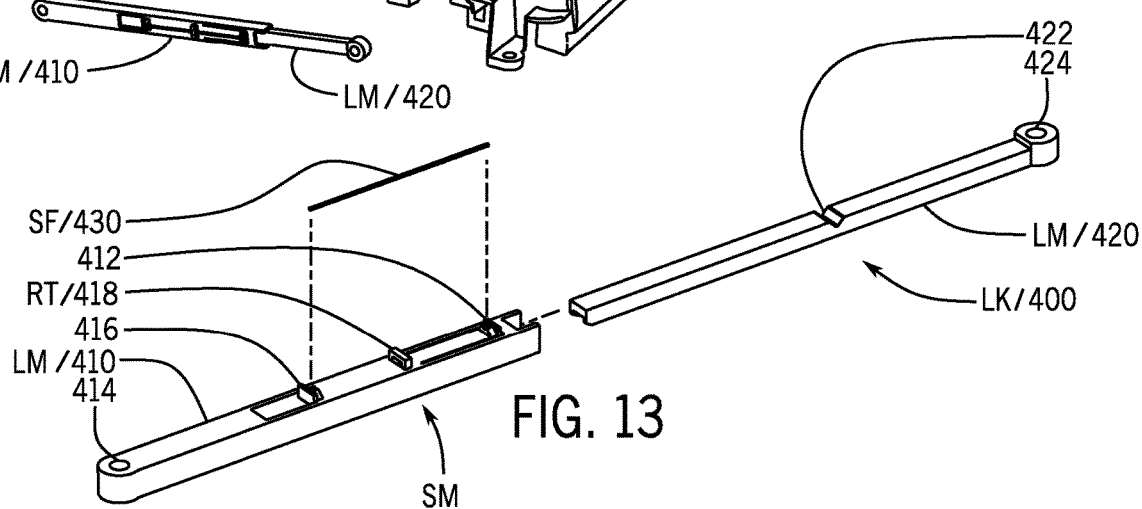
FIG. 12
FIG. 13

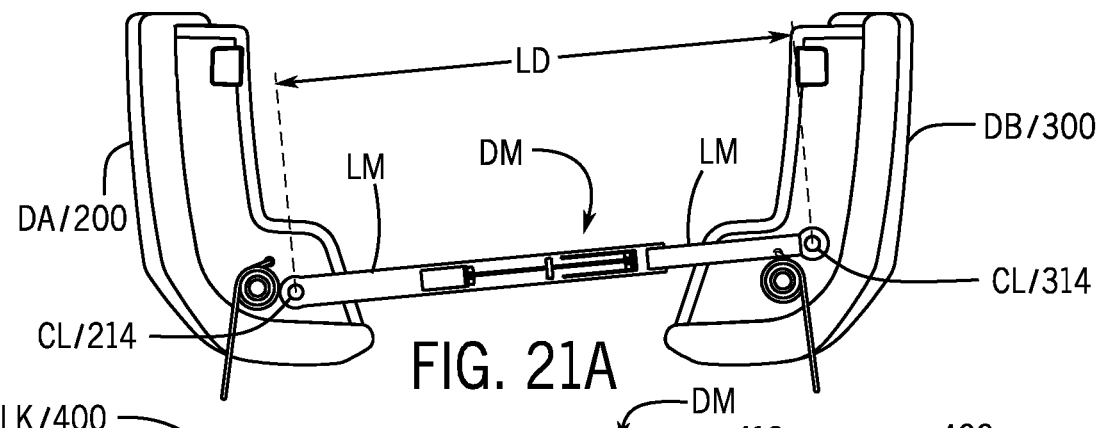
FIG. 21A
FIG. 22A
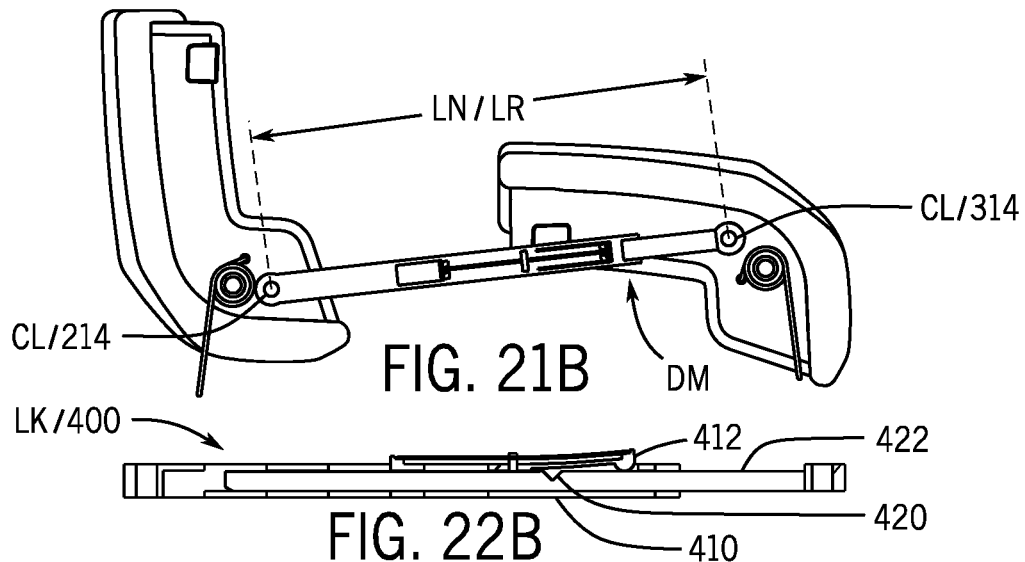
FIG. 21B
FIG. 22B
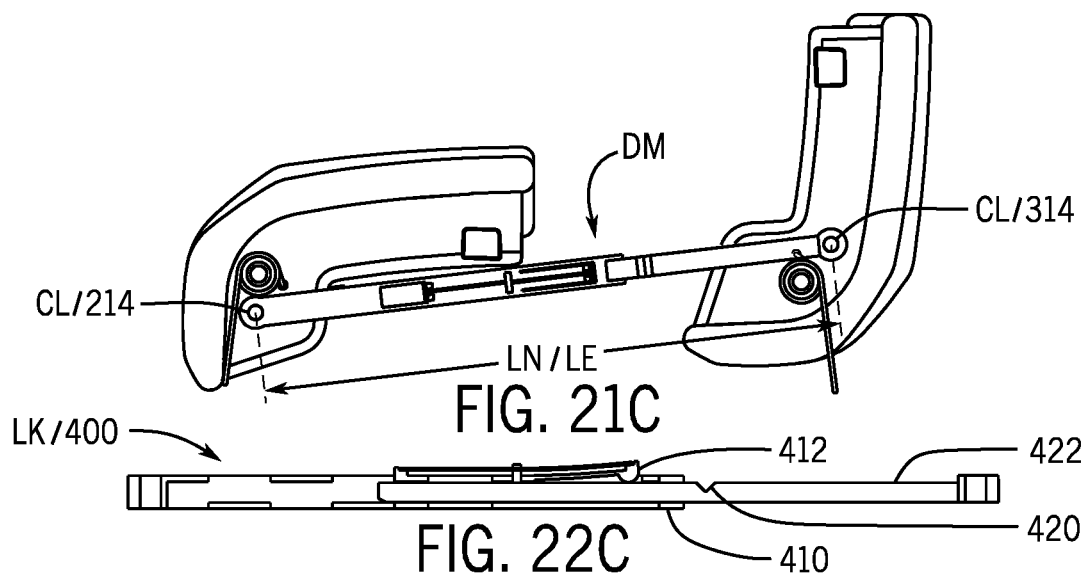
FIG. 21C
FIG. 22C

VEHICLE INTERIOR COMPONENT

CROSS-REFERENCE TO RELATED APPLICATIONS

The present application is a continuation in part of U.S. patent application Ser. No. 16/700,488 titled "VEHICLE INTERIOR COMPONENT" filed Dec. 2, 2019 which is a continuation of International/PCT Patent Application No. PCT/US19/47238 titled "VEHICLE INTERIOR COMPONENT" filed Aug. 20, 2019, which claims the benefit of U.S. Provisional Patent Application No. 62/720,921 titled "VEHICLE INTERIOR COMPONENT" filed Aug. 21, 2018.

The present application claims priority to and incorporates by reference in full the following patent applications: (a) U.S. Provisional Patent Application No. 62/720,921 titled "VEHICLE INTERIOR COMPONENT" filed Aug. 21, 2018; (b) International/PCT Patent Application No. PCT/US19/47238 titled "VEHICLE INTERIOR COMPONENT" filed Aug. 20, 2019; (c) U.S. patent application Ser. No. 16/700,488 titled "VEHICLE INTERIOR COMPONENT" filed Dec. 2, 2019.

FIELD

The present invention relates a vehicle interior component.

BACKGROUND

It is known to provide a vehicle interior component including a base, a cover comprising a first door movable relative to the base between a closed position and an open position, and a second door movable relative to the base between a closed position and an open position.

It would be advantageous to provide an improved vehicle interior component including a base and a cover comprising a first door movable relative to the base between a closed position and an open position and a second door movable relative to the base between a closed position and an open position and a linkage configured for a coupled state to couple movement of the doors and a decoupled state to de-couple movement of the doors.

SUMMARY

The present invention relates to a vehicle interior component comprising a base providing a compartment, a cover movable relative to the base comprising a first door movable between a closed position and an open position and a second door movable between a closed position and an open position, and a mechanism configured to couple the first door and the second door. The mechanism may be configured to provide (1) an engaged state to couple movement of the first door and the second door from the closed position to the open position and (2) a disengaged state to decouple movement of the first door and the second door from the open position to the closed position. The mechanism may comprise a first member coupled to the first door and a second member coupled to the second door. The second member may be configured to at least one of (a) extend relative to the first member and/or (b) retract relative to the first member. At least one of the first member and the second member may be configured to flex relative to the other of the first member and the second member. The mechanism may comprise a detent mechanism configured to couple the first member to the second member. At least one of the first member and the second member may be a flexible member. The mechanism may comprise a hub; the hub may comprise a detent mechanism configured to engage the first member with the second member and to provide (1) the engaged state of the mechanism with the first member engaged to the second member and (2) the disengaged state of the mechanism with the first member disengaged from the second member.

The present invention relates to a vehicle interior component comprising a base providing a compartment, a cover movable relative to the base comprising a first door movable between a closed position and an open position and a second door movable between a closed position and an open position, and a mechanism configured to couple the first door and the second door. The mechanism may comprise a linkage comprising a length. The length of the linkage may comprise an effective length between a coupling to the first door and a coupling to the second door. The effective length of the linkage may comprise a default length to couple movement of the first door with movement of the second door. The effective length of the linkage may comprise a non-default length to allow movement of the first door independent of movement of the second door. The non-default length of the linkage may comprise at least one of (a) an extended length longer than the default length; (b) a retracted length shorter than the default length. Movement of the cover relative to the base may comprise (1) an open state with the first door in the open position and the second door in the open position and (2) a first partially open state with the first door in the open position and the second door in the closed position and (3) a second partially open state with the first door in the closed position and the second door in the open position and (4) a closed state with the first door in the closed position and the second door in the closed position. The linkage may comprise a first link member coupled to the first door and a second link member coupled to the second door. The mechanism may comprise a detent mechanism configured to couple the first link member to the second link member. The mechanism may comprise a rotary hub on a shaft.

The present invention relates to a vehicle interior component comprising a base providing a compartment, a cover movable relative to the base comprising a first door movable between a closed position and an open position and a second door movable between a closed position and an open position, and a mechanism configured to couple the first door and the second door. The mechanism may comprise a first member coupled to the first door and a second member coupled to the second door. At least one of the first member and the second member may be configured to flex to facilitate movement of one of the first door and the second door to the closed position with the other of the first door and the second door in the open position. The second member may be configured to at least one of (a) extend relative to the first member; (b) retract relative to the first member. The second member may be configured to slide relative to the first member. The mechanism may comprise a detent mechanism configured to couple the first member to the second member. The detent mechanism may comprise at least one of (a) a recess and a protrusion; (b) a notch and a projection. The mechanism may comprise a link mechanism comprising a linkage; the linkage may comprise an effective length between a coupling of the first member to the first door and a coupling of the second member to the second door so that the effective length of the linkage may comprise a default length to couple the first member to the second member.

The present invention relates to a vehicle interior component comprising: a base providing a compartment; a first cover movable relative to the base between a closed position and an open position; a second cover movable relative to the base between a closed position and an open position; and a link coupled to the first cover and the second cover. The link may be configured to couple movement of the first cover and the second cover from the closed position to the open position; the link may be configured to decouple movement of the first cover and the second cover from the open position to the closed position. One of the first cover and the second cover may be configured to remain in the open position as the other of the first cover and the second cover moves from the open position to the closed position. The component may further comprise a spring configured to compress to enable the first cover and the second cover to move relative to one another. The spring may be configured to couple movement of the first cover and the second cover from the closed position to the open position. The spring may comprise a coil spring. The component may further comprise a spring; when the first cover is in the open position, the second cover is in the open position and an external force is applied to move the first cover from the open position toward the closed position, the spring may be configured to compress to maintain the second cover in the open position. The component may further comprise a spring configured to compress in response to movement of the first cover from the open position toward the closed position.

The present invention relates to a vehicle interior component comprising: a base providing a compartment; a first cover movable relative to the base between a closed position and an open position; a second cover movable relative to the base between a closed position and an open position; and a link coupled to the first cover and the second cover. The link may be configured for (a) a coupled state to couple movement of the first cover and the second cover and (b) a decoupled state to de-couple movement of the first cover and the second cover; the link may comprise a first arm and a second arm; one of the first arm and the second arm may comprise a depression and the other of the first arm and the second arm may comprise a protrusion; the protrusion may be configured to engage the depression to couple the first arm and the second arm. When an external force is applied to move the first cover from the open position toward the closed position, the first arm may be configured to rotate relative to the second arm to disengage the protrusion and the depression to enable the first arm to move relative to the second arm. The component may further comprise a spring; the spring may be configured to compress to disengage the protrusion and the depression to enable the first arm and the second arm to move relative to one another. The base may comprise a shaft; the link may be configured to (a) couple the first cover to the shaft and (b) couple the second cover to the shaft. The second arm may comprise a female feature; the first arm may comprise a male feature configured to rotate within the female feature of the second arm. The component may further comprise a spring configured to compress in response to movement of the first cover from the open position toward the closed position. The component may further comprise a spring; the spring may be configured to bias the first arm to engage the second arm.

The present invention relates to a vehicle interior component comprising: a base providing a compartment; a first cover movable relative to the base between a closed position and an open position; a second cover movable relative to the base between a closed position and an open position; a link coupled to the first cover and the second cover; and a shaft coupled to the base. The link may comprise a first arm and a second arm; one of the first arm and the second arm may be configured to rotate about the shaft and the other of the first arm and the second arm may be configured to be fixed to de-couple movement of the first cover and the second cover. The first arm may be coupled to the base at the shaft and the second arm may be coupled to the base at the shaft. The component may further comprise a spring; the spring may be configured to bias the first arm to engage the second arm. The link may be configured to (a) couple the first cover to the shaft and (b) couple the second cover to the shaft. The first arm may comprise a ball and socket joint. The component may comprise at least one of a console; a center console; a floor console.

The present invention relates to a vehicle interior component comprising a base providing a compartment, a first cover movable relative to the base between a closed position and an open position, a second cover movable relative to the base between a closed position and an open position and a link coupled to the first cover and the second cover. The link may be configured to couple movement of the first cover and the second cover from the closed position to the open position; the link may be configured to decouple movement of the first cover and the second cover from the open position to the closed position. One of the first cover and the second cover may be configured to remain in the open position as the other of the first cover and the second cover moves from the open position to the closed position. The component may comprise a spring configured to (a) couple movement of the first cover and the second cover from the closed position to the open position; and (b) compress to enable the first cover and the second cover to move relative to one another. The link may comprise a first arm and a second arm; the first arm may be configured to move relative to the second arm to enable one of the first cover and the second cover to remain in the open position as the other of the first cover and the second cover moves from the open position to the closed position. One of the first arm and the second arm may comprise a depression and the other of the first arm and the second arm may comprise a protrusion; the protrusion may be configured to engage the depression to couple the first arm and the second arm. The link may comprise a spring; the spring may be configured to compress to disengage the protrusion and the depression to enable the first arm and the second arm to move relative to one another. The second arm may comprise a female feature; the first arm may comprise a male feature configured to rotate within the female feature of the second arm. The first arm may comprise a ball and socket joint. The first arm may comprise a bar and a coupler; the second arm may comprise a bar and coupler coupled to the coupler of the first arm. The base may comprise a shaft; the link may be configured to couple the first cover to the shaft and couple the second cover to the shaft.

The present invention relates to a vehicle interior component comprising a base providing a compartment, a first cover movable relative to the base between a closed position and an open position, a second cover movable relative to the base between a closed position and an open position and a link coupled to the first cover and the second cover. The link may be configured for a coupled state to couple movement of the first cover and the second cover and a decoupled state to de-couple movement of the first cover and the second cover. The link may comprise a first arm and a second arm. The first arm may be coupled to the second arm to link movement of the first cover and the second cover. The first arm and the second arm may be configured to move relative to one another to de-couple movement of the first cover and the second cover. One of the first arm and the second arm may comprise a depression and the other of the first arm and the second arm may comprise a protrusion; the protrusion may be configured to engage the depression to couple the first arm and the second arm. The component may comprise a spring. When an external force is applied to move the first cover from the open position toward the closed position, the spring may be compressed to disengage the protrusion and the depression to enable the first arm and the second arm to move relative to one another.

The present invention relates to a vehicle interior component comprising a base providing a compartment, a first cover movable relative to the base between a closed position and an open position, a second cover movable relative to the base between a closed position and an open position, a link coupled to the first cover and the second cover and a shaft coupled to the base. The link may comprise a first arm and a second arm; the first arm may be coupled to the base at the shaft and the second arm may be coupled to the base at the shaft. The first arm may be configured to rotate about the shaft as the first cover moves between the closed position of the first cover and the open position of the first cover and the second arm may be configured to rotate about the shaft as the second cover moves between the closed position of the second cover and the open position of the second cover. The first arm may be configured to rotate with the second arm about the shaft as the first cover moves from the closed position of the first cover to the open position of the first cover and the second cover moves from the closed position of the second cover to the open position of the second cover. One of the first arm and the second arm may be configured to rotate about the shaft and the other of the first arm and the second arm may be fixed to de-couple movement of the first cover and the second cover. One of the first arm and the second arm may comprise a depression and the other of the first arm and the second arm may comprise a protrusion; the protrusion may be configured to engage the depression to couple the first arm and the second arm. When an external force is applied to move the first cover from the open position toward the closed position, the first arm may be configured to rotate relative to the second arm to disengage the protrusion and the depression to enable the first arm to move relative to the second arm. The component may comprise spring. The spring may be configured to bias the first arm to engage the second arm. The spring may be configured to compress as one of the first cover and the second cover moves from the open position to the closed position. The spring may be configured to compress to de-couple movement of the first arm and the second arm. The spring may be configured to couple movement of the first arm and the second arm as the first cover moves from the closed position of the first cover to the open position of the first cover and the second cover moves from the closed position of the second cover to the open position of the second cover.

The present invention relates to a vehicle interior component comprising a base providing a compartment; a first cover movable relative to the base between a closed position and an open position; a second cover movable relative to the base between a closed position and an open position; a link coupled to the first cover and the second cover; and a spring. The spring may be configured to bias the link to couple movement of the first cover and the second cover from the closed position to the open position. The spring may be configured to compress to enable one of the first cover and the second cover to remain in the open position as the other of the first cover and the second cover moves from the open position to the closed position. The link may comprise a first arm and a second arm; the spring may be configured to bias the second arm to engage the first arm. The spring may be configured compress in response to movement of the first cover from the open position toward the closed position.

FIGURES

FIGS. 4A-4C are schematic partial exploded perspective views of a vehicle interior component according to an exemplary embodiment.

FIGS. 5A-5F are schematic partial section views of a vehicle interior component according to an exemplary embodiment.

FIGS. 7A-7F are schematic partial section views of a vehicle interior component according to an exemplary embodiment.

FIG. 12 is a schematic exploded perspective view of a vehicle interior component according to an exemplary embodiment.

FIG. 13 is a schematic exploded partial perspective view of a vehicle interior component according to an exemplary embodiment.

FIGS. 21A to 21C are schematic partial section views of a vehicle interior component according to an exemplary embodiment.

FIGS. 22A to 22C are schematic partial section views of a vehicle interior component according to an exemplary embodiment.

DESCRIPTION

Figure 1A:
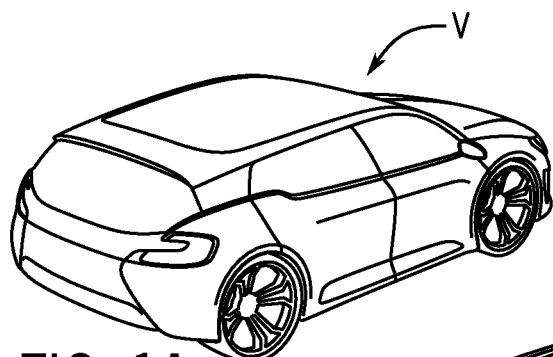
FIG. 1A is a schematic perspective view of a vehicle according to an exemplary embodiment.
Figure 1B:
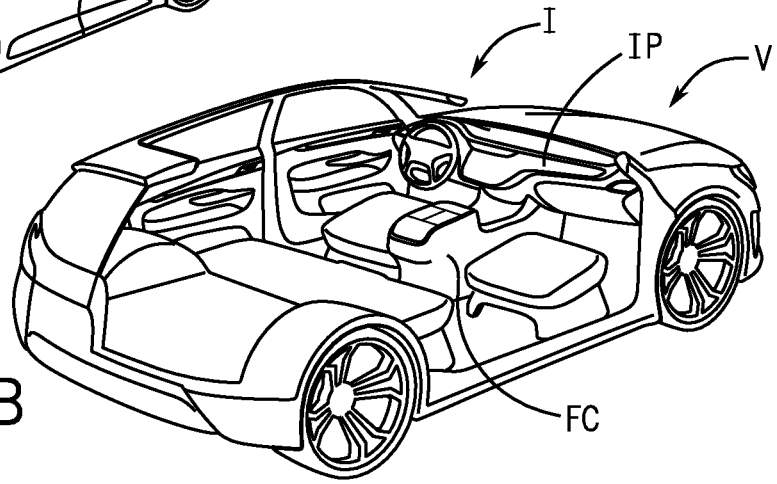
FIG. 1B is a schematic perspective view of a vehicle showing a vehicle interior according to an exemplary embodiment.
Figure 2A:
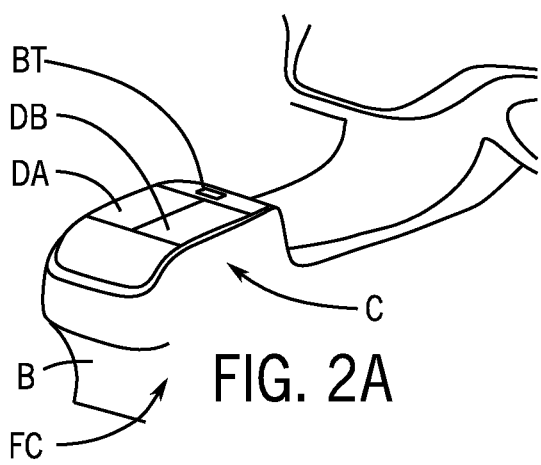
FIGS. 2A-2D are schematic perspective views of a vehicle interior component according to an exemplary embodiment.
Figure 2B:
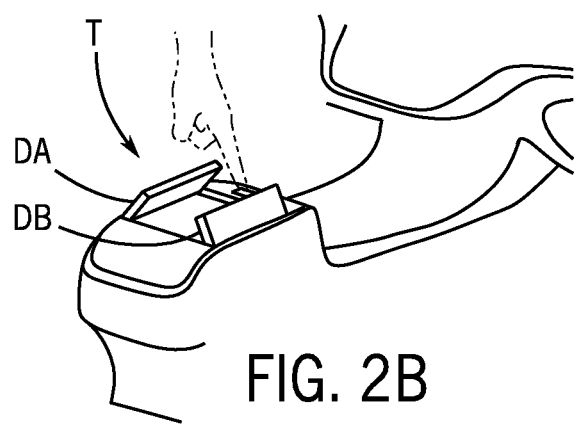
Figure 2C:
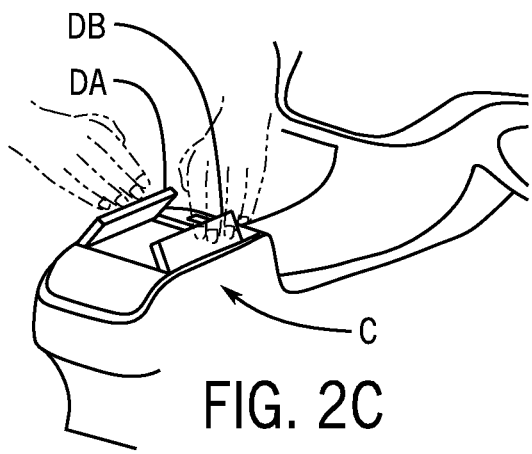
Figure 2D:
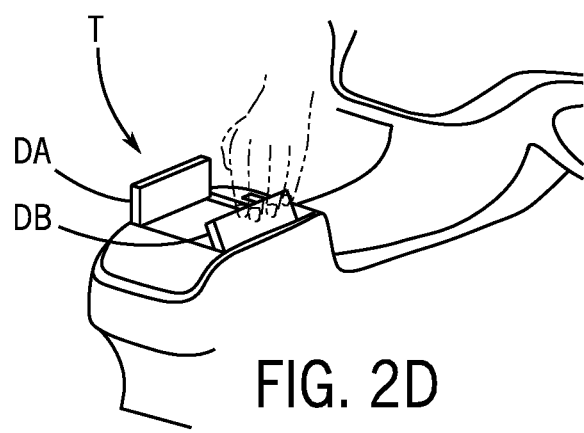
Figure 3A:
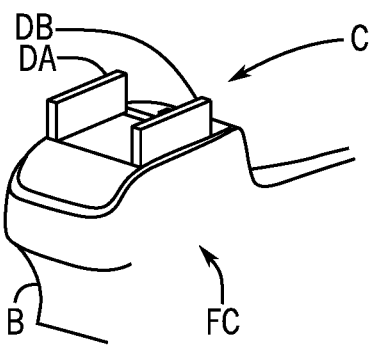
FIGS. 3A-3I are schematic perspective views of a vehicle interior component according to an exemplary embodiment.
Figure 3B:
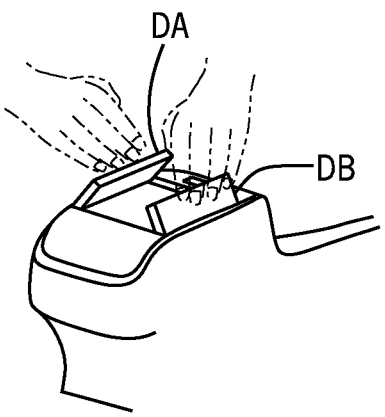
Figure 3C:
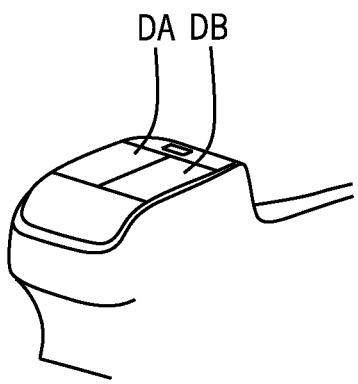
Figure 3D:
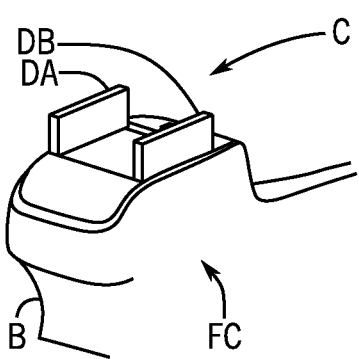
Figure 3E:
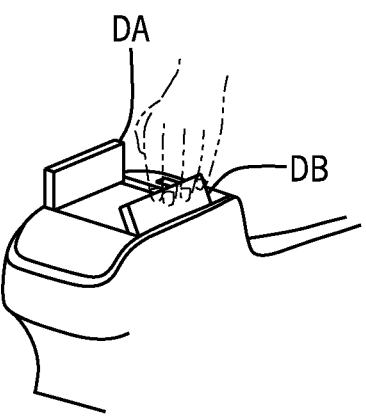
Figure 3F:
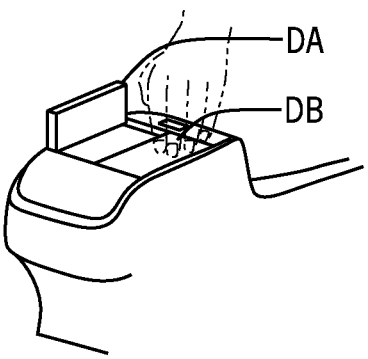
Figure 3G:
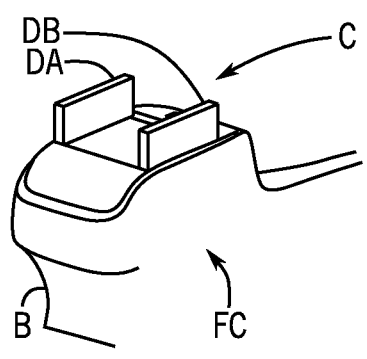
Figure 3H:
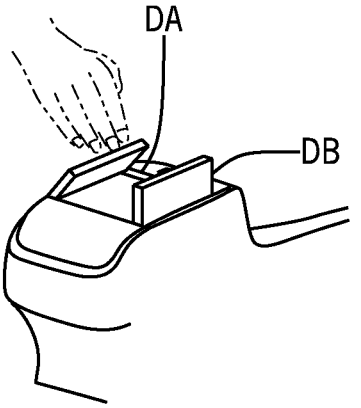
Figure 3I:
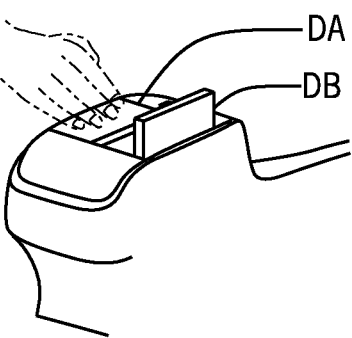
Figure 6A:
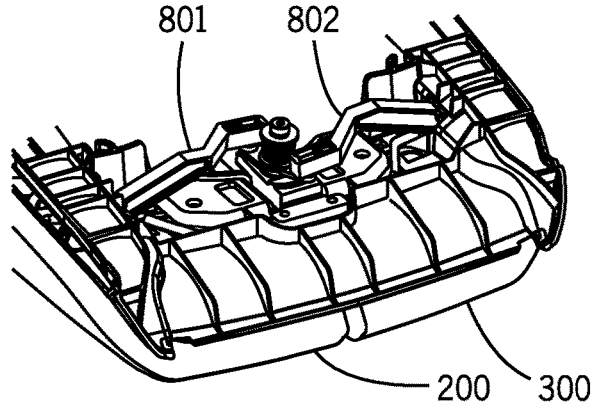
FIGS. 6A-6F are schematic partial perspective views of a vehicle interior component according to an exemplary embodiment.
Figure 6B:
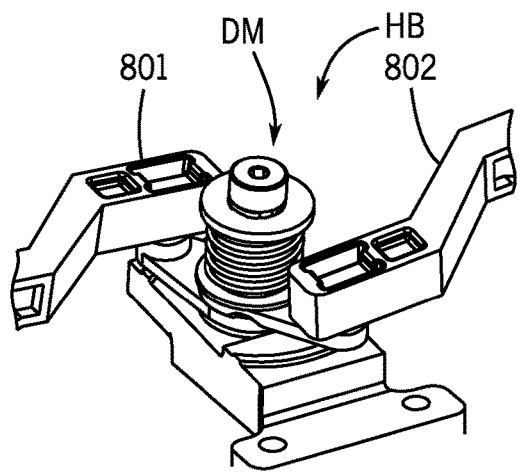
Figure 6C:
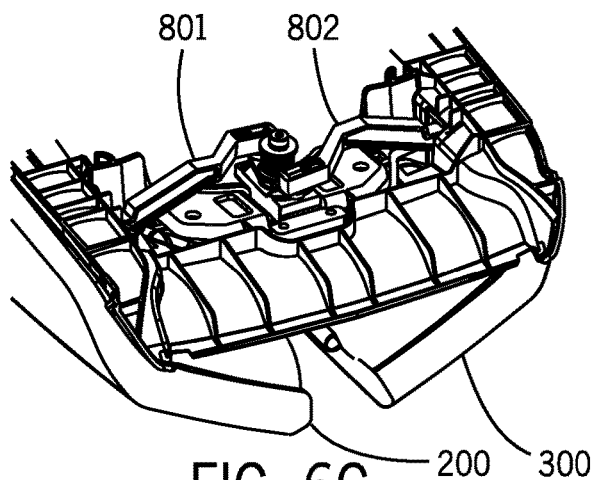
Figure 6D:
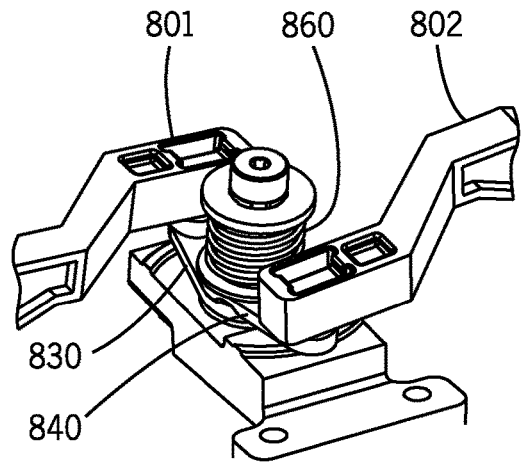
Figure 6E:
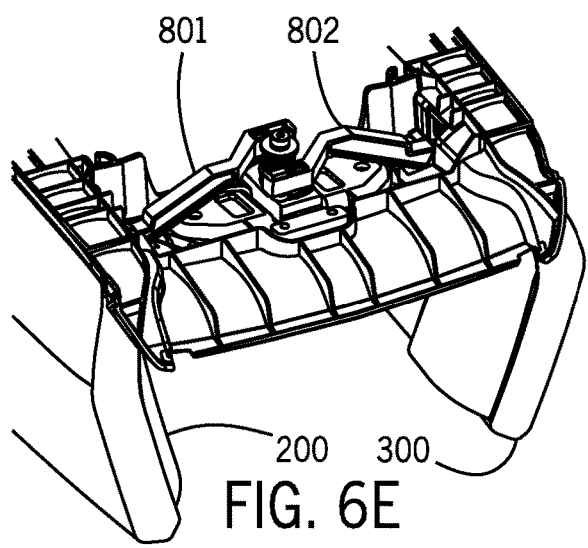
Figure 6F:
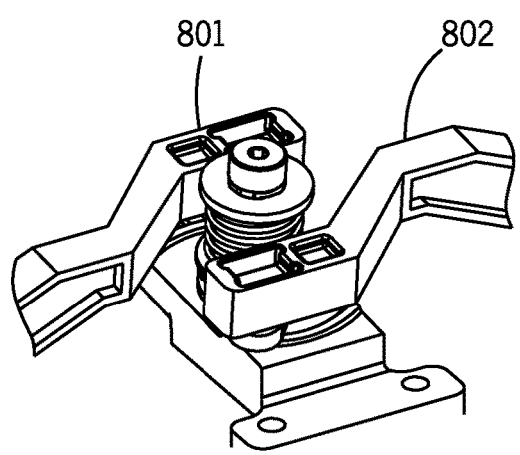
Figures 8A, 8B:
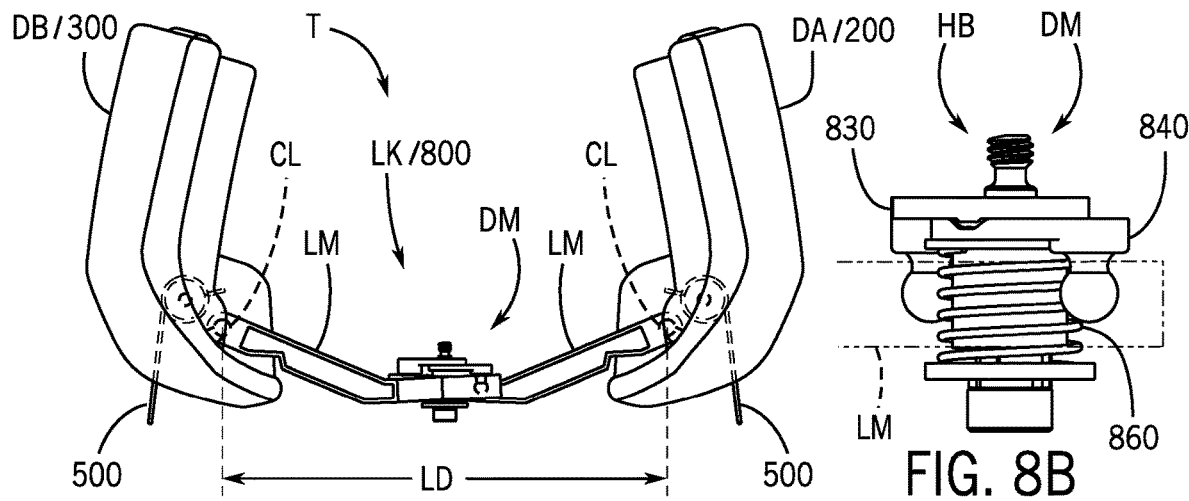
FIGS. 8A-8F are schematic partial section views of a vehicle interior component according to an exemplary embodiment.
Figures 8C, 8D:
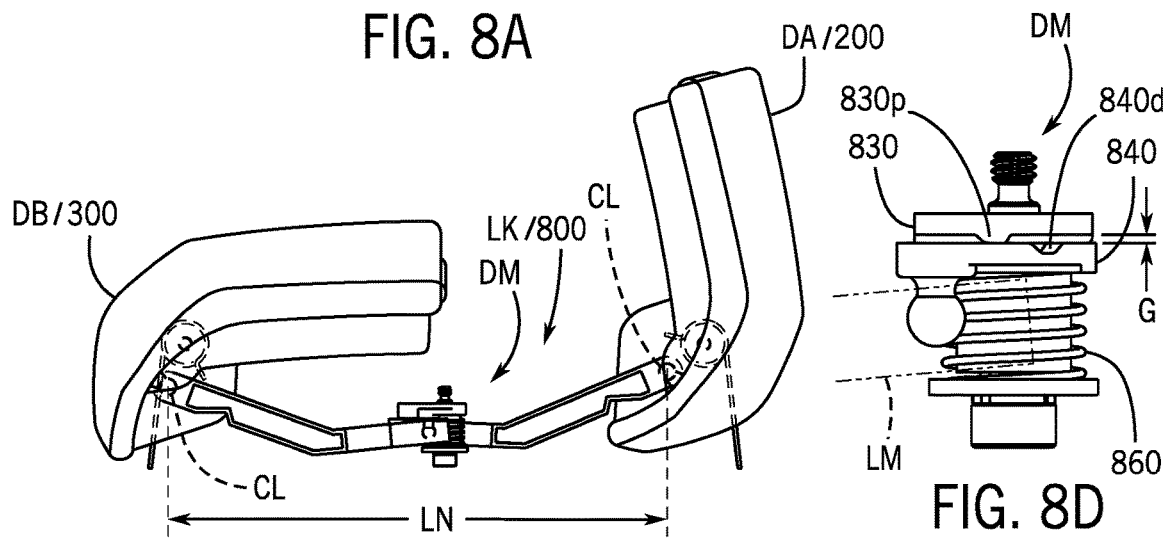
Figures 8E, 8F:
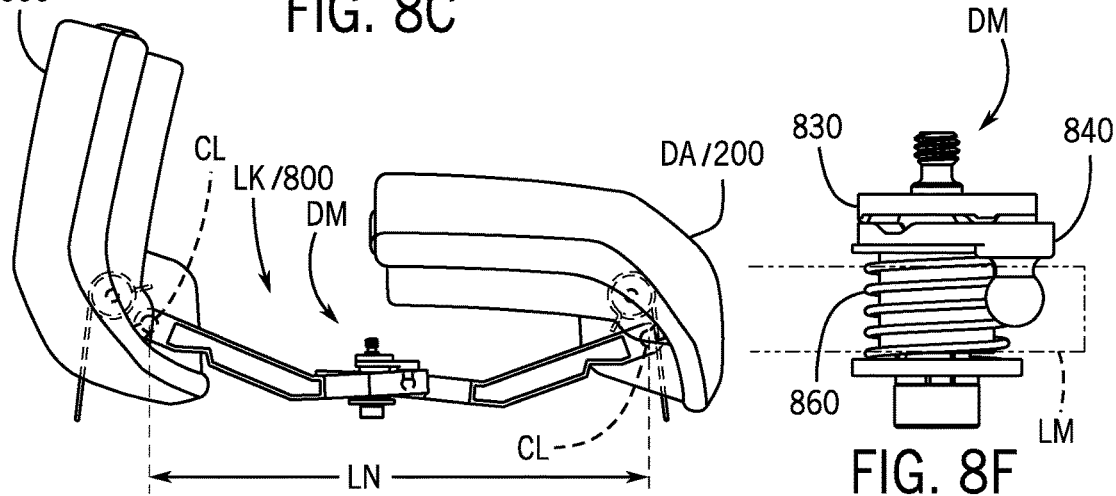
Figure 9A:
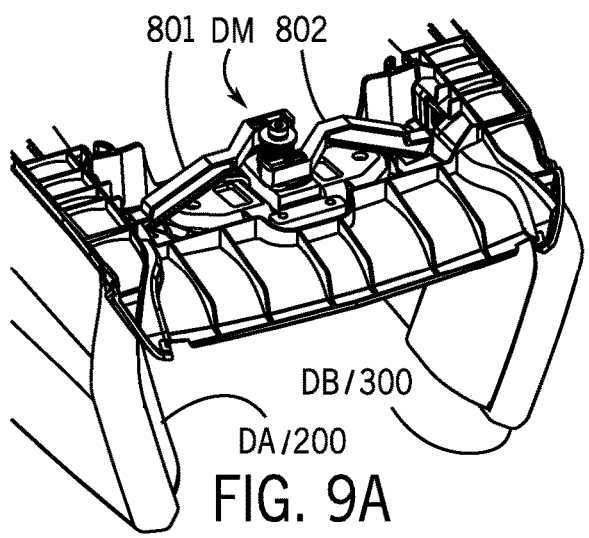
FIGS. 9A-9F are schematic partial perspective views of a vehicle interior component according to an exemplary embodiment.
Figure 9B:
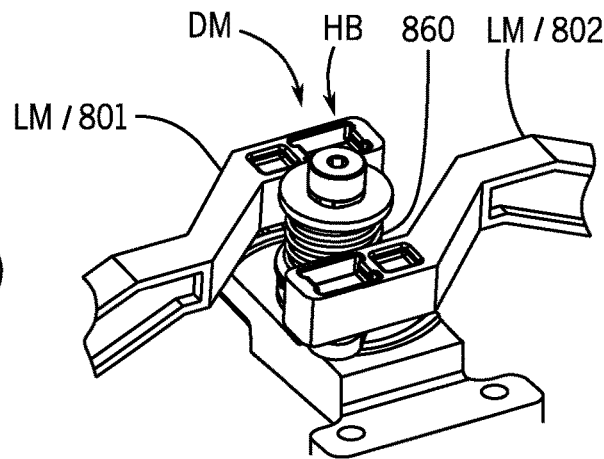
Figure 9C:
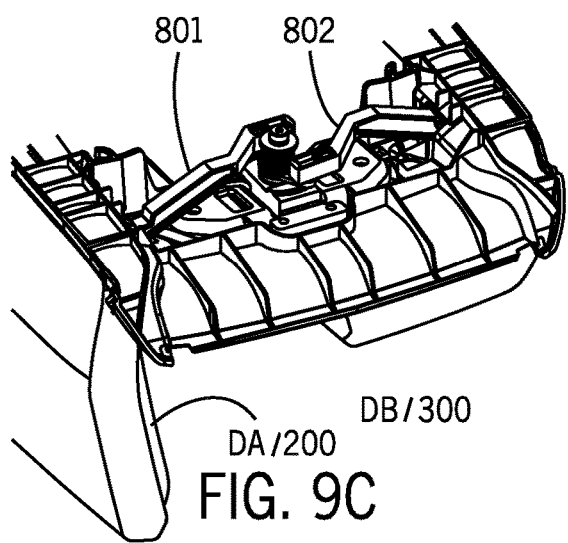
Figure 9D:
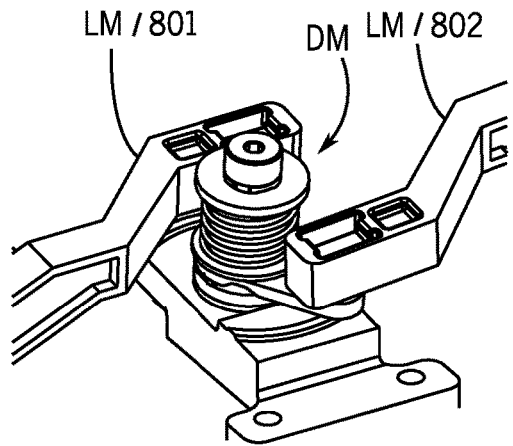
Figure 9E:
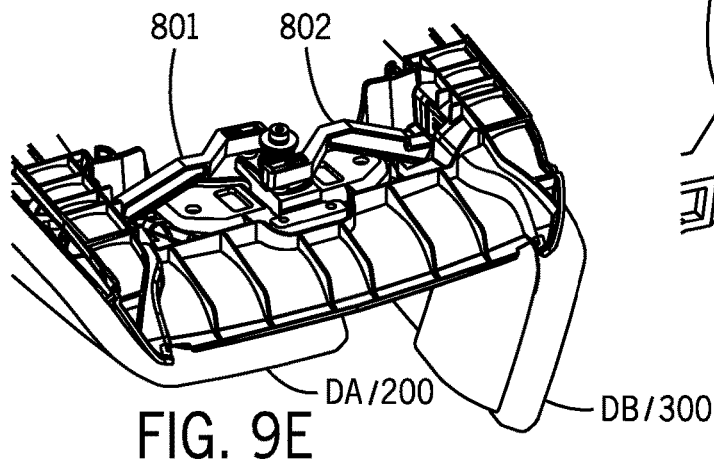
Figure 9F:
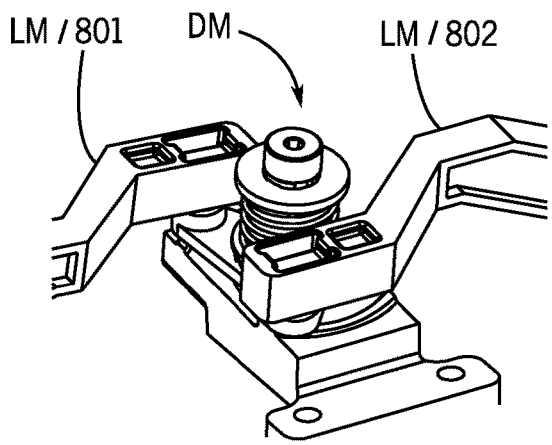
Figure 10A:
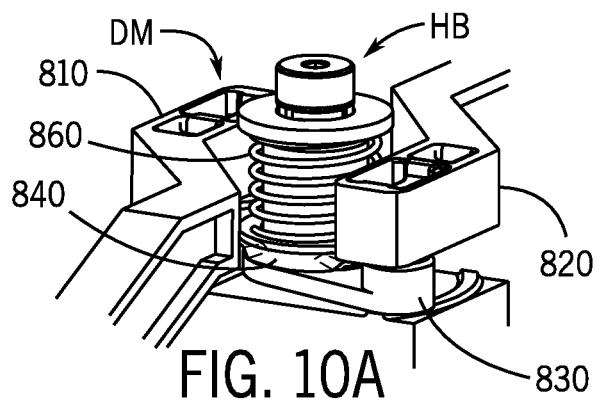
FIG. 10A is a schematic partial perspective views of a vehicle interior component according to an exemplary embodiment.
Figure 10B:
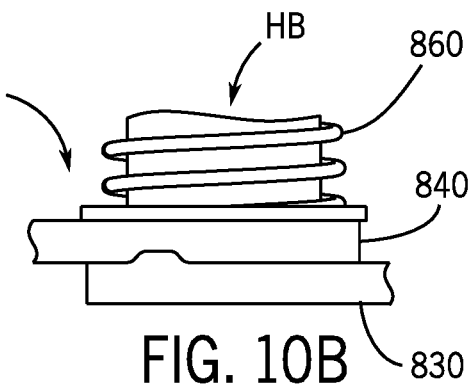
FIG. 10B is a schematic partial section view of a vehicle interior component according to an exemplary embodiment.
Figure 10C:
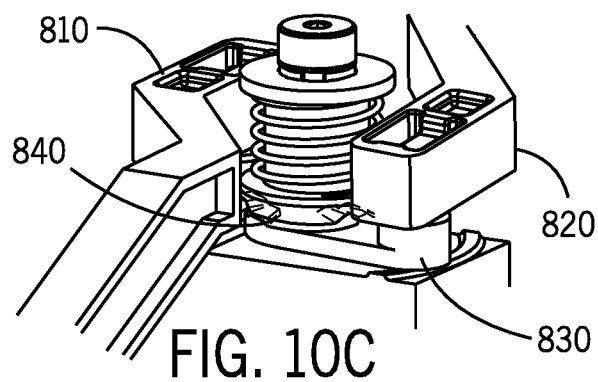
FIG. 10C is a schematic partial perspective views of a vehicle interior component according to an exemplary embodiment.
Figure 10D:
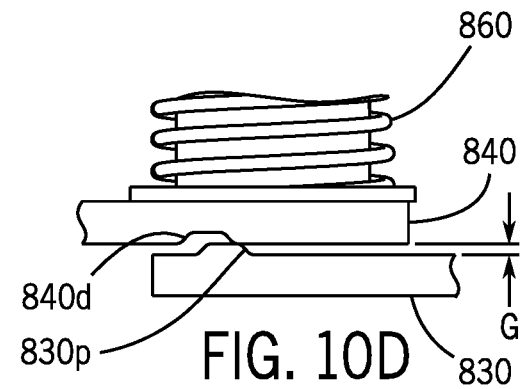
FIG. 10D is a schematic partial section view of a vehicle interior component according to an exemplary embodiment.
Figure 10E:
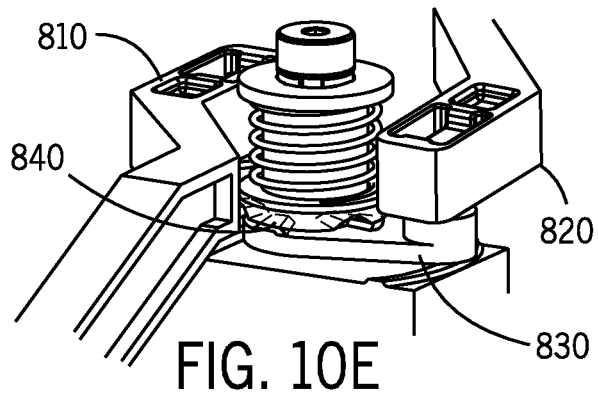
FIG. 10E is a schematic partial perspective views of a vehicle interior component according to an exemplary embodiment.
Figure 10F:
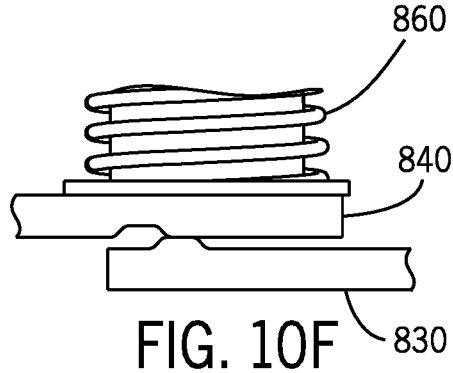
FIG. 10F is a schematic partial section view of a vehicle interior component according to an exemplary embodiment.
Figure 10G:
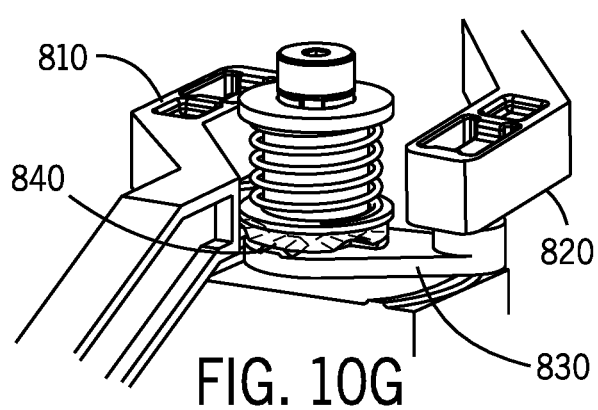
FIG. 10G is a schematic partial perspective views of a vehicle interior component according to an exemplary embodiment.
Figure 10H:
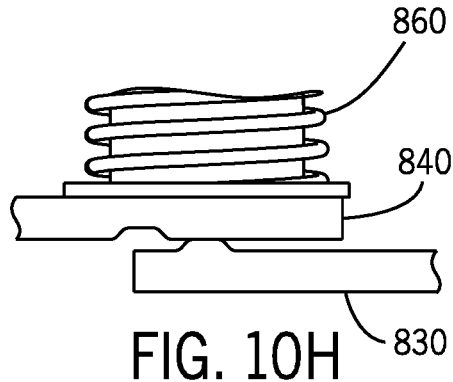
FIG. 10H is a schematic partial section view of a vehicle interior component according to an exemplary embodiment.

Referring to FIGS. 1A-1B and 2A-2D, a vehicle V with an interior I comprising components C such a floor console FC and instrument panel IP is shown schematically according to an exemplary embodiment. As shown schematically in FIGS. 2A-2D and 3A-3I, component C shown as floor console FC comprises a base B and a cover T with doors DA and DB moveable relative to base B between a closed position and an open position (i.e. to allow access to a compartment within the base).

As indicated schematically according to an exemplary embodiment in FIGS. 2A-2D and 3A-3I, component C may comprise a mechanism/release operated by a vehicle occupant at an operator control shown as button BT (e.g. to actuate a latch/latch mechanism); when the cover is in a closed state with doors DA and DB in the closed position actuation (e.g. of button BT by a vehicle occupant to release the latch) may allow doors DA and DB to move to the open position with the cover in an open state (e.g. under a force provided such as by a spring arrangement operating to rotate each of doors DA and DB at a pivot joint); doors DA and DB may be coupled at a connection point CL by a linkage/link mechanism shown as comprising a link LK. See also FIGS. 8A-8F, 9A-9F, 21A-21C and 22A-22C and TABLE A.

As indicated schematically in FIGS. 2C and 3A-3C, when cover T is in the open state both doors DA and DB may be moved together from the open position to the closed position to put the cover into the closed state (with both doors in the closed position). See also FIGS. 5A-5F, 6A-6F, 7A-7F, 8A-8B, 9A-9B, 20A-20C, 21A and 22A and TABLE A.

As indicated schematically in FIGS. 2D and 3D-3I, when cover T is in the open state each door DA or DB may be moved independently from the open position to the closed position to put the cover into a partially open state (with one door in the open position and one door in the closed position). See also FIGS. 8C-8F, 9C-9F, 21B-21C and 22B-22C and TABLE A.

According to an exemplary embodiment as shown schematically in FIGS. 2A-2D, 3A-3I, 5A-5F, 6A-6F, 7A-7F, 8A-8F, 9A-9F, 20A-20C, 21A-21C and 22A-22C, vehicle interior component C/3000 shown as a floor console FC may comprise a base B providing a compartment and a cover T comprising a first door DA/200 and a second door DB/300 configured to be operated by application of an external force from an occupant shown as a hand. As shown schematically in FIGS. 2A-2D and 3A-3I, first door DA/200 may be movable relative to base B between a closed position to at least partially cover the compartment and an open position; second door DB/300 may be movable relative to base B between a closed position to at least partially cover the compartment and an open position. See also TABLE A.

As shown schematically in FIGS. 2A-2D and 3A-3I, first door DA/200 and second door DB/300 of cover T may be configured for movement between (a) an open state with first door DA/200 in the open position and second door DB/300 in the open position; (b) a first partially open state with first door DA/200 in the open position and second door DB/300 in the closed position; (c) a second partially open state with first door DA/200 in the closed position second door DB/300 in the open position; (d) a closed state with first door DA in the closed position and second door DB/300 in the closed position. See also TABLE A. As indicated schematically in FIGS. 8C-8F, 9C-9F, 21B-21C and 22B-22C, first door DA/200 may be configured to remain in the open position as second door DB/300 moves from the open position to the closed position; second door DB/300 may be configured to remain in the open position as first door DA/200 moves from the open position to the closed position. As shown schematically in FIGS. 2A-2D and 3A-3I, first door DA/200 and second door DB/300 of cover T may be configured for (a) a coupled state to couple movement of first door DA/200 and second door DB/300 and (b) a decoupled state to de-couple movement of first door DA/200 and second door DB/300. See also FIGS. 5A-5F. 6A-6F. 7A-7F. 8A-8B, 9A-9B, 20A-20C, 21A and 22A and TABLE A.

As indicated schematically according to an exemplary embodiment in FIGS. 8A-8F and 9A-9F, the component with cover T may comprise a link mechanism/linkage/link LK/800 with a set of link members LM configured to couple door DA to door DB at connection points CL to provide an effective length for linkage LK (i.e. distance between the connection points to each door). As indicated schematically in FIGS. 8A-8B and 9A-9B, the link mechanism with linkage LK may comprise a detent mechanism DM (e.g. comprising a projection to engage an indentation such as a notch) to retain the effective length of linkage LK in a default length LD; link members LM of linkage LK may be configured to disengage at detent mechanism DM and/or move so that the effective length of linkage LK may be provided in a non-default length LN. See FIGS. 8C-8F and 9A-9F and TABLE A.

As indicated schematically according to an exemplary embodiment in FIGS. 21A-21C and 22A-22C, the link mechanism/linkage may comprise link LK with a set of link members LM configured to couple door DA to door DB at connection points CL to provide an effective length for link LK (i.e. distance between the connection points to each door). As indicated schematically in FIGS. 21A and 22B, the link mechanism with link LK may comprise a detent mechanism DM (e.g. comprising a projection to engage an indentation such as a notch) to retain the effective length of link LK in a default length LD; link members LM of link LK may be configured to flex and/or move so that the effective length of link LK may be provided in a non-default length LN comprising an extended length LE and/or a retracted length LR. See FIGS. 21B-21C and 22B-22C and TABLE A.

ment of the detent mechanism DM on the link LK). See TABLE A. As indicated schematically in FIGS. 3I, 8E-8F, 9E-9F, 17B, 21C and 22C, the cover may be put from the second partially open state to the closed state by movement of door DA from the open position to the closed position (e.g. by manual operation of a vehicle occupant); link LK may be returned from extended length LE to default length LD with re-engagement of the detent mechanism DM. See TABLE A.

TABLE A

| COVER (T) STATE | DETENT MECHANISM (DM) STATE | EFFECTIVE LENGTH OF LINK (LK) | FIRST DOOR (DA) POSITION | SECOND DOOR (DB) POSITION | EXAMPLE FIGS. |
|---|---|---|---|---|---|
| COVER STATE/DOOR POSITION | | | | | |
| Open State | Engaged | Default length LD | Open | Open | FIGS. 3A, 3D, 3G, 5E-5F, 6E-6F, 7A-7B, 8A-8B, 9A-9B, 14C, 15A, 16A, 17A, 18C, 20A, 21A, 22A |
| First Partially Open State | Disengaged | Non-Default length LN | Open | Closed | FIGS. 3F, 8C-8D, 9C-9D, 16B, 21B, 22B |
| Second Partially Open State | Disengaged | Non-Default length LN | Closed | Open | FIGS. 3I, 8E-8F, 9E-9F, 17B, 21C, 22C |
| Closed State | Engaged | N/A | Closed | Closed | FIGS. 2A, 3C, 5A-5B, 6A-6B, 7E-7F, 14A, 15C, 18A, 20C |

As indicated schematically in FIGS. 2C and 3A-3C, when cover T is in the open state both doors DA and DB may be moved together from the open position to the closed position (e.g. by manual operation of a vehicle operator) with link LK retained at the default length LD to put the cover into the closed state (with both doors in the closed position). See also TABLE A. As indicated schematically in FIGS. 3D-3F, when cover T is in the open state door DA may be moved independently from the open position to the closed position (e.g. by manual operation of a vehicle operator) to put the cover into a first partially open state with door DA in the open position and door DB in the closed position with link LK in a non-default length LN shown as retracted length LR (e.g. by relative movement of link members LM and disengagement of the detent mechanism DM on the link LK). See also TABLE A. As indicated schematically in FIGS. 3F, 8C-8D, 9C-9D, 16B, 21B and 22B, the cover may be transitioned from the first partially open state to the closed state by movement of door DB from the open position to the closed position; link LK may then be returned from the retracted length LR to the default length LD with re-engagement of detent mechanism DM. See TABLE A. As indicated schematically in FIGS. 3G-3I, when cover T is in the open state door DB may be moved independently from the open position to the closed position (e.g. by manual operation of a vehicle occupant) to put the cover into a second partially open state with door DB in the open position and door DA in the closed position with link LK in a non-default length LN shown as extended length LE (e.g. by relative movement of link members LM and disengage- According to an exemplary embodiment as shown schematically in FIGS. 2A-2D, 3A-3I, 5A-5F, 6A-6F, 7A-7F, 8A-8F, 9A-9F, 20A-20C, 21A-21C and 22A-22C, a vehicle interior component may comprise a base providing a compartment, a cover movable relative to the base comprising a first door DA movable between a closed position and an open position and a second door DB movable between a closed position and an open position, and a mechanism configured to couple the first door DA and the second door DB. According to an exemplary embodiment as shown schematically in FIGS. 5A-5F, 6A-6F, 7A-7F, 8A-8F, 9A-9F, 20A-20C, 21A-21C and 22A-22C, the mechanism may be configured to provide (1) an engaged state to couple movement of the first door DA and the second door DB from the closed position to the open position and (2) a disengaged state to decouple movement of the first door DA and the second door DB from the open position to the closed position. According to an exemplary embodiment as shown schematically in FIGS. 5A-5F, 6A-6F, 7A-7F, 8A-8F, 9A-9F, 20A-20C, 21A-21C and 22A-22C, the mechanism may comprise a first member LM coupled to the first door DA and a second member LM coupled to the second door DB; the second member LM may be configured to at least one of (a) extend relative to the first member LM and/or (b) retract relative to the first member LM. According to an exemplary embodiment as shown schematically in FIGS. 20A-20C, 21A-21C and 22A-22C, at least one of the first member LM and the second member LM may be configured to flex relative to the other of the first member LM and the second member LM; at least one of the first member LM and the second member LM may comprise a flexible member. According to an exemplary embodiment as shown schematically in FIGS. 5A-5F, 6A-6F, 7A-7F, 8A-8F, 9A-9F, 20A-20C, 21A-21C and 22A-22C, the mechanism may comprise a detent mechanism DM configured to couple the first member LM to the second member LM. According to an exemplary embodiment as shown schematically in FIGS. 5A-5F. 6A-6F. 7A-7F, 8A-8F, 9A-9F and 10A-10H, the mechanism may comprise a hub HB; hub HB may comprise a detent mechanism DM configured to engage the first member LM with the second member LM and to provide (1) the engaged state of the mechanism with the first member LM engaged to the second member LM and (2) the disengaged state of the mechanism with the first member LM disengaged from the second member LM. See also FIGS. 20A-20C, 21A-21C, and 22A-22C.

According to an exemplary embodiment as shown schematically in FIGS. 2A-2D, 3A-3I, 5A-5F, 6A-6F, 7A-7F, 8A-8F, 9A-9F, 20A-20C, 21A-21C and 22A-22C, a vehicle interior component C may comprise a base B providing a compartment, a cover T movable relative to the base B comprising a first door DA movable between a closed position and an open position and a second door DB movable between a closed position and an open position, and a mechanism/linkage LK configured to couple the first door DA and the second door DB. According to an exemplary embodiment as shown schematically in FIGS. 5A-5F, 6A-6F, 7A-7F. 8A-8F, 9A-9F, 20A-20C, 21A-21C and 22A-22C, linkage LK may comprise a length; the length of the linkage may comprise an effective length between a coupling to first door DA and a coupling to second door DB; the effective length of the linkage may comprise a default length LD to couple movement of first door DA with movement of second door DB; the effective length of the linkage may comprise a non-default length LN to allow movement of first door DA independent of movement of second door DB. See also TABLE A. According to an exemplary embodiment as shown schematically in FIGS. 20A-20C, 21A-21C and 22A-22C, the non-default length LN of the linkage may comprise at least one of (a) an extended length LE longer than the default length LD; (b) a retracted length LR shorter than the default length LD. See TABLE A. According to an exemplary embodiment as shown schematically in FIGS. 2A-2D and 3A-3I, movement of the cover relative to the base may comprise (1) an open state with the first door DA in the open position and the second door DB in the open position and (2) a first partially open state with the first door DA in the open position and the second door DB in the closed position and (3) a second partially open state with the first door DA in the closed position and the second door DB in the open position and (4) a closed state with the first door DA in the closed position and the second door DB in the closed position. See also FIGS. 5A-5F, 6A-6F, 7A-7F, 8A-8F, 9A-9F, 20A-20C, 21A-21C and 22A-22C and TABLE A. According to an exemplary embodiment as shown schematically in FIGS. 5A-5F, 6A-6F, 7A-7F, 8A-8F, 9A-9F, 20A-20C, 21A-21C and 22A-22C, the mechanism/linkage LK may comprise a first link member LM coupled to first door DA and a second link member LM coupled to second door DB; the mechanism may comprise a detent mechanism DM configured to couple the first link member LM to the second link member LM. According to an exemplary embodiment as shown schematically in FIGS. 5A-5F, 6A-6F, 7A-7F, 8A-8F and 9A-9F, the mechanism may comprise a rotary hub HB on a shaft. See also FIGS. 10A-10H.

According to an exemplary embodiment as shown schematically in FIGS. 2A-2D, 3A-3I, 5A-5F, 6A-6F, 7A-7F, 8A-8F, 9A-9F, 20A-20C, 21A-21C and 22A-22C, a vehicle interior component C may comprise a base providing a compartment B, a cover T movable relative to the base B comprising a first door DA movable between a closed position and an open position and a second door DB movable between a closed position and an open position, and a mechanism configured to couple the first door DA and the second door DB. According to an exemplary embodiment as shown schematically in FIGS. 5A-5F, 6A-6F, 7A-7F. 8A-8F, 9A-9F, 20A-20C, 21A-21C and 22A-22C, the mechanism may comprise a first member LM coupled to first door DA and a second member LM coupled to second door DB. According to an exemplary embodiment as shown schematically in FIGS. 20A-20C, 21A-21C and 22A-22C, at least one of the first member LM and the second member LM may be configured to flex to facilitate movement of one of first door DA and second door DB to the closed position with the other of first door DA and second door DB in the open position; the second member LM may be configured to slide relative to the first member LM. According to an exemplary embodiment as shown schematically in FIGS. 5A-5F, 6A-6F, 7A-7F, 8A-8F, 9A-9F, 20A-20C, 21A-21C and 22A-22C, the second member LM may be configured to at least one of (a) extend relative to the first member LM; (b) retract relative to the first member LM. According to an exemplary embodiment as shown schematically in FIGS. 5A-5F, 6A-6F, 7A-7F, 8A-8F, 9A-9F, 20A-20C, 21A-21C and 22A-22C, the mechanism may comprise a detent mechanism DM configured to couple the first member LM to the second member LM; the detent mechanism DM may comprise at least one of (a) a recess and a protrusion; (b) a notch and a projection. According to an exemplary embodiment as shown schematically in FIGS. 5A-5F, 6A-6F, 7A-7F, 8A-8F, 9A-9F, 20A-20C. 21A-21C and 22A-22C, the mechanism may comprise a link mechanism/linkage LK; linkage LK may comprise an effective length between a coupling of the first member LM to first door DA and a coupling of the second member LM to second door DB so that the effective length of the linkage may comprise a default length LD to couple the first member LM to the second member LM. See TABLE A.

Exemplary Embodiments—A

According to an exemplary embodiment as shown schematically in FIGS. 2A-2D and 3A-3I, vehicle interior component 3000 shown as a floor console FC may comprise a base B, a first cover C1/300 and a second cover C2/200. Vehicle interior component 3000/FC may be configured to be operated by application of an external force from an occupant shown as a hand H/H1/H2. Base B may provide a compartment. First cover C1/300 may be movable relative to base B between a closed position as shown schematically in FIGS. 2A and 3C and 3I to at least partially cover the compartment and an open position as shown schematically in FIGS. 2D, 3A and 3D-3G to uncover the compartment. Second cover C2/200 may be movable relative to base B between a closed position as shown schematically in FIGS. 2A, 3C and 3F to at least partially cover the compartment and an open position as shown schematically in FIGS. 3A, 3D and 3G-3I. First cover C1/300 and second cover C2/200 may be configured for movement between (a) a first state with first cover C1/300 in the open position of first cover C1/300 and second cover C2/200 in the open position of second cover C2/200 as shown schematically in FIGS. 3A, 3D and 3G; (b) a second state with first cover C1/300 in the closed position of first cover C1/300 and second cover C2/200 in the open position of second cover C2/200 as shown schematically in FIG. 3I; (c) a third state with first cover C1/300 in the open position of first cover C1/300 and second cover C2/200 in the closed position of second cover C2/200 as shown schematically in FIG. 3F; (d) a fourth state with first cover C1 in the closed position of first cover C1/300 and second cover C2/200 in the closed position of second cover C2/200 as shown schematically in FIGS. 2A and 3C. First cover C1/300 may be configured to remain in the open position as second cover C2/200 moves from the open position to the closed position as shown schematically in FIGS. 2D and 3D-3F. Second cover C2/200 may be configured to remain in the open position as first cover C1/300 moves from the open position to the closed position as shown schematically in FIGS. 3G-3I. Vehicle interior component FC may be configured for (a) a coupled state to couple movement of first cover C1/300 and second cover C2/200 as shown schematically in FIGS. 2A-2B and (b) a decoupled state to de-couple movement of first cover C1/300 and second cover C2/200 as shown schematically in FIGS. 2C, 2D and 3A-3I.

According to an exemplary embodiment as shown schematically in FIG. 4A, vehicle interior component C/3000 may comprise a base B/100, a first cover DA/200 and a second cover DB/300. According to an exemplary embodiment, vehicle interior component C/3000 may comprise a link LK/800. According to an exemplary embodiment, vehicle interior component C/3000 may comprise a set of springs SP/500, an actuator or button and a latch 700. Set of springs SP/500 may be configured to move first cover DA/200 and second cover DB/300 relative to base B/100 between a closed position as shown schematically in FIG. 5A to at least partially cover the compartment and an open position as shown schematically in FIG. 5E to uncover the compartment. A button may be configured to actuate latch 700 to move first cover DA/200 and second cover DB/300 relative to base B/100 between a closed position as shown schematically in FIG. 5A to at least partially cover the compartment and an open position as shown schematically in FIG. 5E to uncover the compartment.

According to an exemplary embodiment as shown schematically in FIGS. 4B and 4C, link LK/800 may comprise a first arm LKA/801, a second arm LKB/802, a spring 860 and a shaft 880. Link LK/800 may comprise a washer 850 and a washer 870. First arm LKA/801 may comprise a protrusion or set of protrusions 830p. Second arm LKB/802 may comprise a depression or set of depressions 840d. Second arm LKB/802 may comprise a female feature 840f; first arm LKA/801 may comprise a male feature 830m configured to rotate within female feature 840f of second arm LKB/802. First arm LKA/801 may comprise a ball and socket joint comprising ball 830b and 810s. Second arm LKB/802 may comprise a ball and socket joint comprising ball 840b and 820s. First arm LKA/801 may comprise a bar LM/810 and a coupler LCA/830; second arm LKB/802 may comprise a bar LM/820 and coupler LCB/840 coupled to coupler LCA/830 of first arm LKA/801. Base B/100 may comprise a shaft 880; link LK/800 may be configured to couple first cover DA/200 to shaft 880 and couple second cover DB/300 to shaft 880.

According to an exemplary embodiment as shown schematically in FIGS. 4A-4C, 5A-5F, 6A-6F, 7A-7F, 8A-8F, 9A-9F and 10A-10H, a vehicle interior component C/3000 may comprise a base B/100 providing a compartment, a first cover DA/200 movable relative to base B/100 between a closed position (see FIGS. 5A, 6A, 7E, 8E and 9E) and an open position (see FIGS. 5E, 6E, 7A, 8A, 8C, 9A and 9C), a second cover DB/300 movable relative to base B/100 between a closed position (see FIGS. 5A, 6A, 7E, 8C and 9C) and an open position (see FIGS. 5E, 6E, 7A, 8A, 8E, 9A and 9E) and a link LK/800 coupled to first cover DA/200 and second cover DB/300. Link LK/800 may be configured to couple movement of first cover DA/200 and second cover DB/300 from the closed position to the open position (see FIGS. 5A-5F and 6A-6F); link LK/800 may be configured to decouple movement of first cover DA/200 and second cover DB/300 from the open position to the closed position (see FIGS. 8A-8F, 9A-9F and 10A-10H). One of first cover DA/200 and second cover DB/300 may be configured to remain in the open position as the other of first cover DA/200 and second cover DB/300 moves from the open position to the closed position (see FIGS. 8A-8F, 9A-9F and 10A-10H). Component C/3000 may comprise a spring 860 configured to (a) couple movement of first cover DA/200 and second cover DB/300 from the closed position to the open position; and (b) compress to enable first cover DA/200 and second cover DB/300 to move relative to one another. Link LK/800 may comprise a first arm LKA/801 and a second arm LKB/802; first arm LKA/801 may be configured to move relative to second arm LKB/802 to enable one of first cover DA/200 and second cover DB/300 to remain in the open position as the other of first cover DA/200 and second cover DB/300 moves from the open position to the closed position (see FIGS. 8A-8F, 9A-9F and 10A-10H). One of first arm LKA/801 and second arm LKB/802 may comprise a depression 840d and the other of first arm LKA/801 and second arm LKB/802 may comprise a protrusion 830p; protrusion 830p may be configured to engage depression 840d to couple first arm LKA/801 and second arm LKB/802 (see FIGS. 5B, 5D, 5F, 7B, 7D and 7F). Link LK/800 may comprise a spring 860; spring 860 may be configured to compress to disengage protrusion 830p and depression 840d to enable first arm LKA/801 and second arm LKB/802 to move relative to one another (see FIGS. 8B, 8D and 8F). Second arm LKB/802 may comprise a female feature 840f; first arm LKA/801 may comprise a male feature 830m configured to rotate within female feature 840f of second arm LKB/802 (see FIGS. 8B, 8D and 8F). First arm LKA/801 may comprise a ball and socket joint comprising ball 830b and 810s. Second arm LKB/802 may comprise a ball and socket joint comprising ball 840b and 820s. First arm LKA/801 may comprise a bar LM/810 and a coupler LCA/830; second arm LKB/802 may comprise a bar LM/820 and coupler LCB/840 coupled to coupler LCA/830 of first arm LKA/801. Base B/100 may comprise a shaft 880; link LK/800 may be configured to couple first cover DA/200 to shaft 880 and couple second cover DB/300 to shaft 880.

According to an exemplary embodiment as shown schematically in FIGS. 4A-4C, 5A-5F, 6A-6F. 7A-7F, 8A-8F, 9A-9F and 10A-10H, a vehicle interior component C/3000 may comprise a base B/100 providing a compartment, a first cover DA/200 movable relative to base B/100 between a closed position (see FIGS. 5A, 6A, 7E, 8E and 9E) and an open position (see FIGS. 5E, 6E, 7A, 8A, 8C, 9A and 9C), a second cover DB/300 movable relative to base B/100 between a closed position (see FIGS. 5A, 6A, 7E, 8C and 9C) and an open position (see FIGS. 5E, 6E, 7A, 8A, 8E, 9A and 9E) and a link LK/800 coupled to first cover DA/200 and second cover DB/300. Link LK/800 may be configured for a coupled state to couple movement of first cover DA/200 and second cover DB/300 (see FIGS. 5A-5F and 6A-6F) and a decoupled state to de-couple movement of first cover DA/200 and second cover DB/300 (see FIGS. 8A-8F, 9A-9F and 10A-10H). Link LK/800 may comprise a first arm LKA/801 and a second arm LKB/802. First arm LKA/801 may be coupled to second arm LKB/802 to link movement of first cover DA/200 and second cover DB/300 (see FIGS. 5B, 5D, 5F, 7B, 7D and 7F). First arm LKA/801 and second arm LKB/802 may be configured to move relative to one another to de-couple movement of first cover DA/200 and second cover DB/300 (see FIGS. 8B, 8D and 8F). One of first arm LKA/801 and second arm LKB/802 may comprise a depression 840d and the other of first arm LKA/801 and second arm LKB/802 may comprise a protrusion 830p; protrusion 830p may be configured to engage depression 840d to couple first arm LKA/801 and second arm LKB/802 (see FIGS. 5B, 5D, 5F, 7B, 7D and 7F). Component C/3000 may comprise a spring 860. When an external force is applied to move first cover DA/200 from the open position toward the closed position, spring 860 may be compressed to disengage protrusion 830p and depression 840d to enable first arm LKA/801 and second arm LKB/802 to move relative to one another (see FIGS. 8B, 8D and 8F).

According to an exemplary embodiment as shown schematically in FIGS. 4A-4C, 5A-5F, 6A-6F, 7A-7F, 8A-8F, 9A-9F and 10A-10H, a vehicle interior component C/3000 may comprise a base B/100 providing a compartment, a first cover DA/200 movable relative to base B/100 between a closed position (see FIGS. 5A, 6A, 7E, 8E and 9E) and an open position (see FIGS. 5E, 6E, 7A, 8A, 8C, 9A and 9C), a second cover DB/300 movable relative to base B/100 between a closed position (see FIGS. 5A, 6A, 7E, 8C and 9C) and an open position (see FIGS. 5E, 6E, 7A, 8A, 8E, 9A and 9E), a link LK/800 coupled to first cover DA/200 and second cover DB/300 and a shaft 880 coupled to base B/100. Link LK/800 may comprise a first arm LKA/801 and a second arm LKB/802; first arm LKA/801 may be coupled to base B/100 at shaft 880 and second arm LKB/802 may be coupled to base B/100 at shaft 880 (see FIG. 4A). First arm LKA/801 may be configured to rotate about shaft 880 as first cover DA/200 moves between the closed position of first cover DA/200 and the open position of first cover DA/200 and second arm LKB/802 may be configured to rotate about shaft 880 as second cover DB/300 moves between the closed position of second cover DB/300 and the open position of second cover DB/300 (see FIGS. 5A-5F and 6A-6F). First arm LKA/801 may be configured to rotate with second arm LKB/802 about shaft 880 as first cover DA/200 moves from the closed position of first cover DA/200 to the open position of first cover DA/200 and second cover DB/300 moves from the closed position of second cover DB/300 to the open position of second cover DB/300 (see FIGS. 5A-5F and 6A-6F). One of first arm LKA/801 and second arm LKB/802 may be configured to rotate about shaft 880 and the other of first arm LKA/801 and second arm LKB/802 may be fixed to de-couple movement of first cover DA/200 and second cover DB/300 (see FIGS. 8A-8F, 9A-9F and 10A-10H). One of first arm LKA/801 and second arm LKB/802 may comprise a depression 840d and the other of first arm LKA/801 and second arm LKB/802 may comprise a protrusion 830p; protrusion 830p may be configured to engage depression 840d to couple first arm LKA/801 and second arm LKB/802 (see FIGS. 5B, 5D, 5F, 7B, 7D and 7F). When an external force is applied to move first cover DA/200 from the open position toward the closed position, first arm LKA/801 may be configured to rotate relative to second arm LKB/802 to disengage protrusion 830p and depression 840d to enable first arm LKA/801 to move relative to second arm LKB/802 (see FIGS. 8B, 8D, 8F, 10B, 10D, 10F and). Component C/3000 may comprise a spring 860. Spring 860 may be configured to bias first arm LKA/801 to engage second arm LKB/802 (see FIGS. 5B, 5D, 5F, 7B, 7D and 7F). Spring 860 may be configured to compress as one of first cover DA/200 and second cover DB/300 moves from the open position to the closed position (see FIGS. 8B, 8D and 8F). Spring 860 may be configured to compress to de-couple movement of first arm LKA/801 and second arm LKB/802 (see FIGS. 8B, 8D and 8F). Spring 860 may be configured to couple movement of first arm LKA/801 and second arm LKB/802 as first cover DA/200 moves from the closed position of first cover DA/200 to the open position of first cover DA/200 and second cover DB/300 moves from the closed position of second cover DB/300 to the open position of second cover DB/300 (see FIGS. 5B, 5D and 5F).

According to an exemplary embodiment as shown schematically in FIGS. 4A-4C, 5A-5F. 6A-6F. 7A-7F, 8A-8F, 9A-9F and 10A-10H, a vehicle interior component C/3000 may comprise a base B/100 providing a compartment, a first cover DA/200 movable relative to base B/100 between a closed position (see FIGS. 5A, 6A, 7E, 8E and 9E) and an open position (see FIGS. 5E, 6E, 7A, 8A, 8C, 9A and 9C), a second cover DB/300 movable relative to base B/100 between a closed position (see FIGS. 5A, 6A, 7E, 8C and 9C) and an open position (see FIGS. 5E, 6E, 7A, 8A, 8E, 9A and 9E), a link LK/800 coupled to first cover DA/200 and second cover DB/300, and a spring 860. Spring 860 may be configured to bias link LK/800 to couple movement of first cover DA/200 and second cover DB/300 from the closed position to the open position (see FIGS. 5B, 5D, 5F, 6B, 6D and 6F). Spring 860 may be configured to compress to enable one of first cover DA/200 and second cover DB/300 to remain in the open position as the other of first cover DA/200 and second cover DB/300 moves from the open position to the closed position (see FIGS. 8B, 8D and 8F). Link LK/800 may comprise a first arm LKA/801 and a second arm LKB/802; spring 860 may be configured to bias second arm LKB/802 to engage first arm LKA/801 (see FIGS. 5B, 5D, 5F, 6B, 6D and 6F). Spring 860 may be configured compress in response to movement of first cover DA/200 from the open position toward the closed position (see FIGS. 8B, 8D and 8F).

Exemplary Embodiments—B

Figure 11:
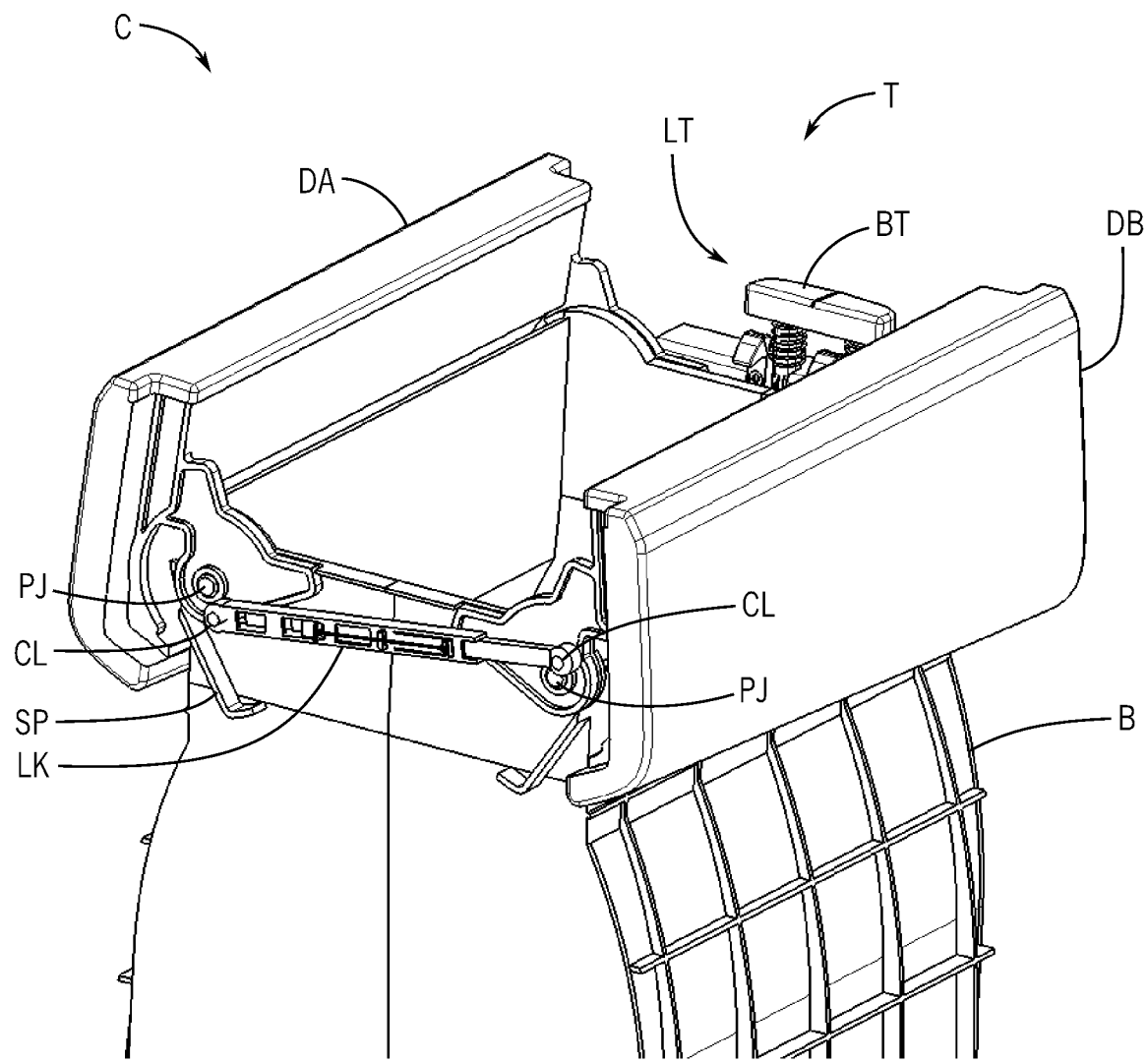
FIG. 11 is a schematic partial perspective view of a vehicle interior component according to an exemplary embodiment.
Figure 14A:
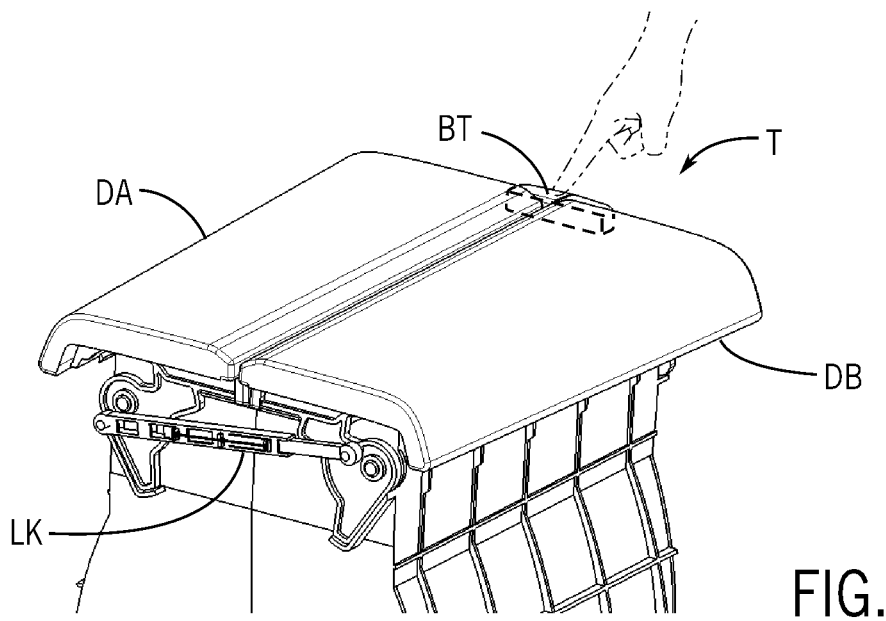
FIGS. 14A to 14C are schematic partial perspective views of a vehicle interior component according to an exemplary embodiment.
Figure 14B:
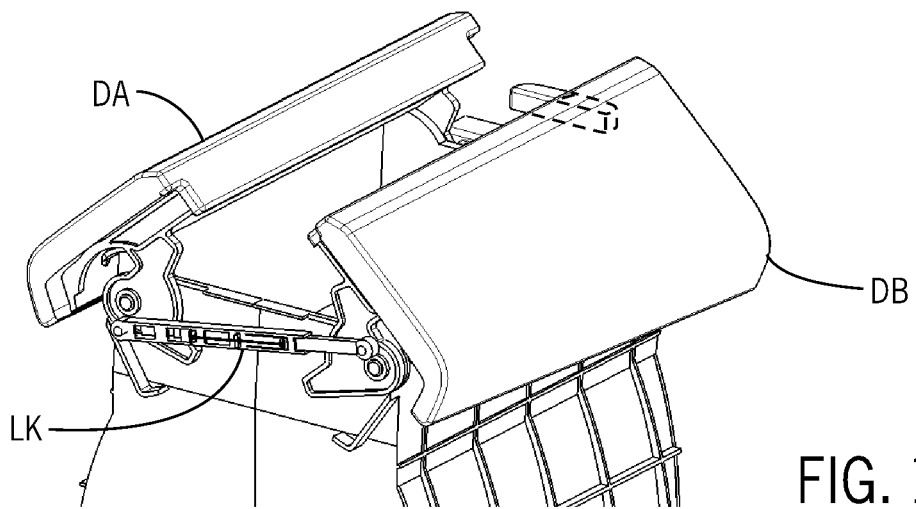
Figure 14C:
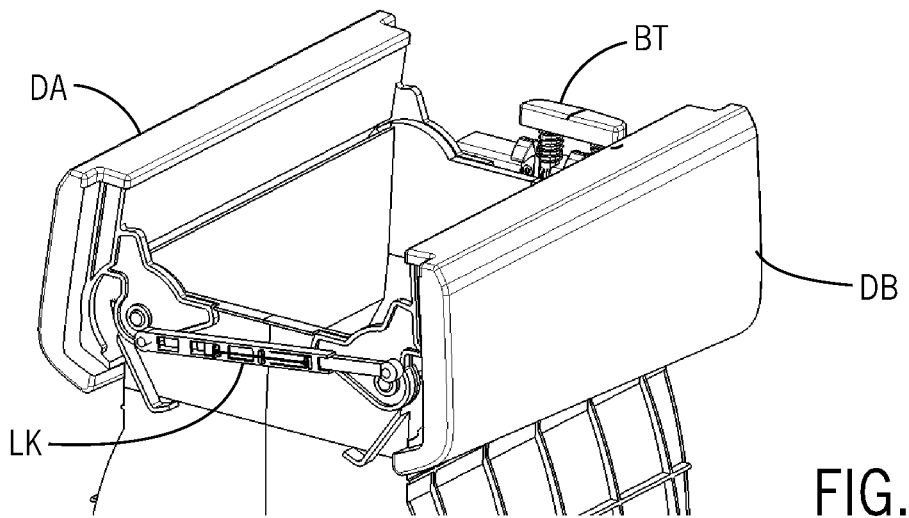
Figure 15A:
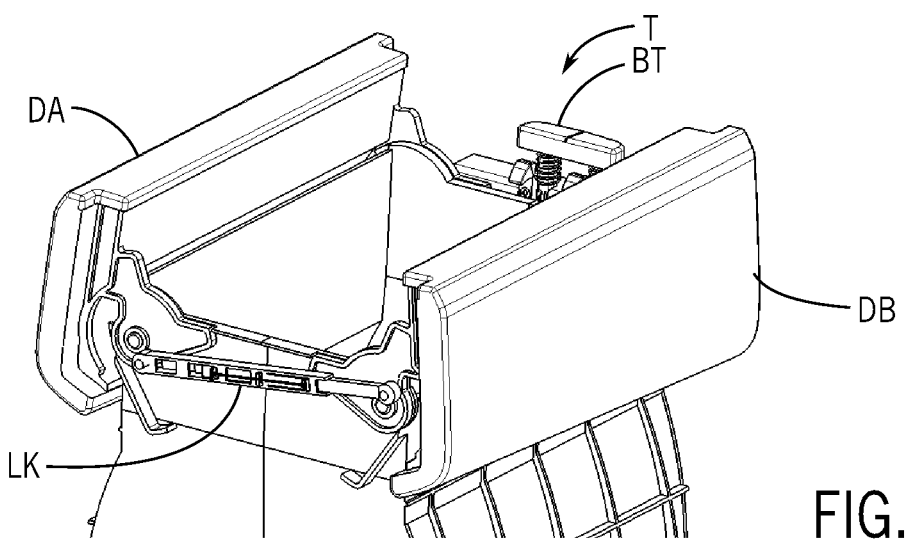
FIGS. 15A to 15C are schematic partial perspective views of a vehicle interior component according to an exemplary embodiment.
Figure 15B:
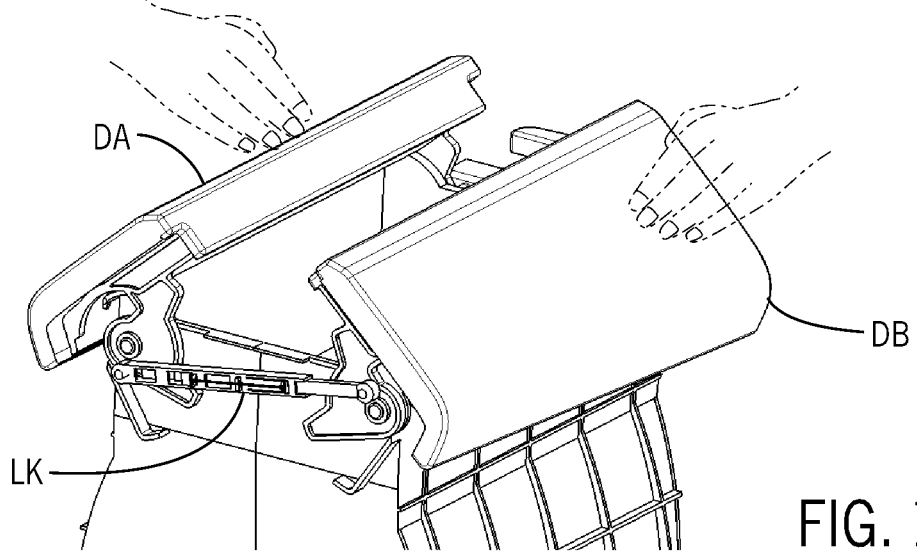
Figure 15C:
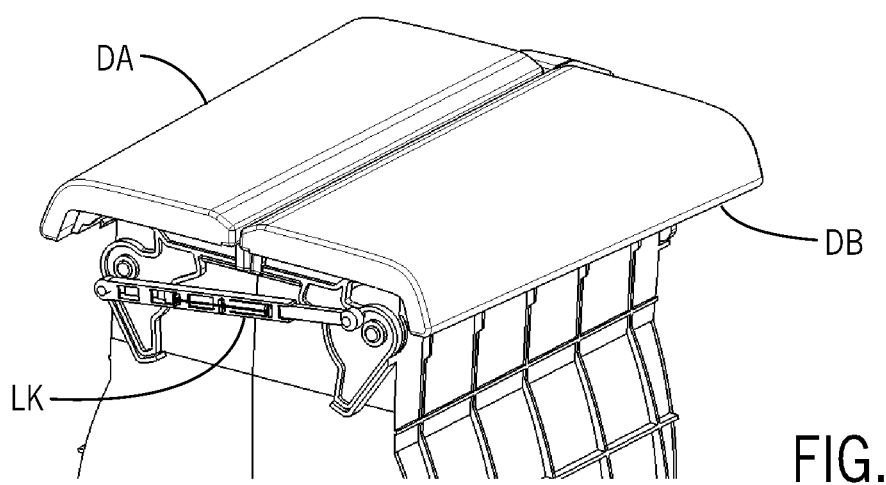
Figure 16A:
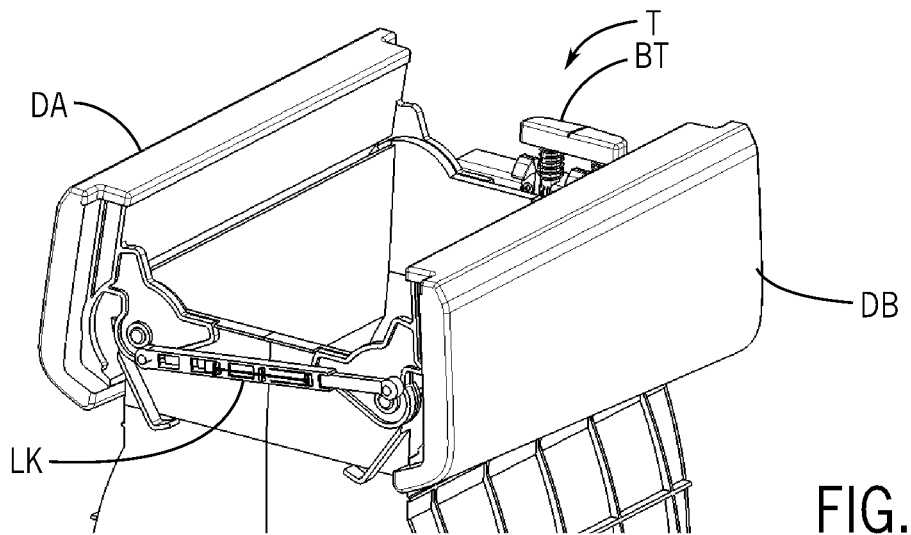
FIGS. 16A to 16B are schematic partial perspective views of a vehicle interior component according to an exemplary embodiment.
Figure 16B:
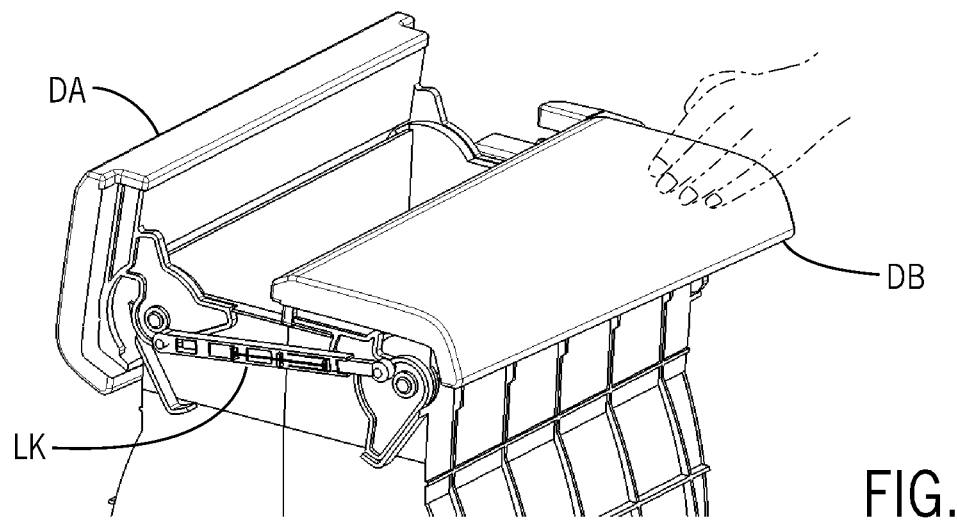
Figure 17A:
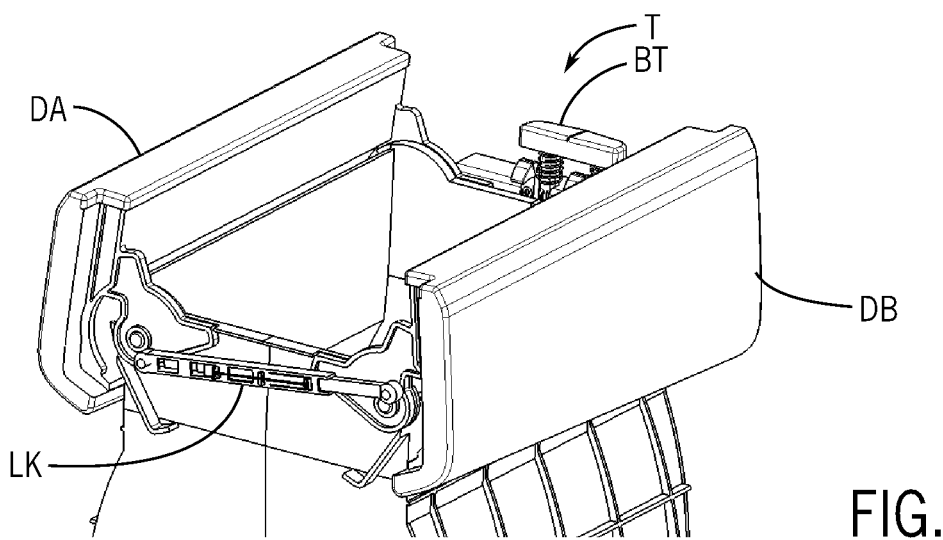
FIGS. 17A to 17B are schematic partial perspective views of a vehicle interior component according to an exemplary embodiment.
Figure 17B:
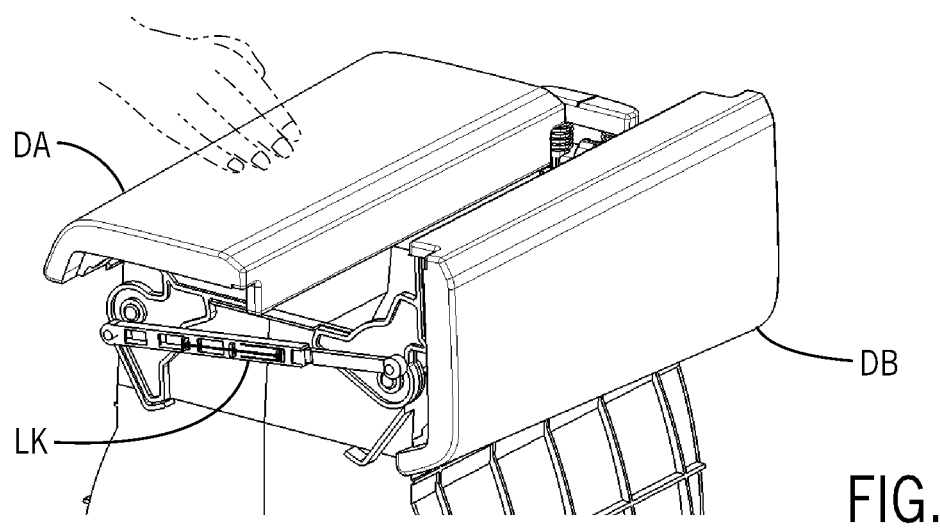

As indicated schematically according to an exemplary embodiment in FIGS. 11, 12 and 13, the link mechanism may comprise link LK with a set of link members LM configured to couple door DA to door DB at connection points CL to provide an effective length for link LK (i.e. distance between the connection points to each door). As indicated schematically in FIGS. 11, 12, 13, 21A-21C and 22A-22C, the link mechanism with link LK may comprise a detent mechanism DM (e.g. comprising a projection to engage an indentation such as a notch) to retain the effective length of link LK in a default length DL; link members LM of link LK may be configured to flex and/or move so that the effective length of link LK may be provided in a non-default length comprising an extended length LE and/or a retracted length LR. See also FIGS. 18A-18C, 19 and 20A-20C and TABLE B.

TABLE B

LINK LENGTH FOR COVER STATE/DOOR POSITION

| COVER (T) STATE | EFFECTIVE LENGTH OF LINK (LK) | FIRST DOOR (DA) POSITION | SECOND DOOR (DB) POSITION | EXAMPLE FIGS. |
|---|---|---|---|---|
| Open State | Default length LD | Open | Open | FIGS. 3A, 3D, 3G, 14C, 15A, 16A, 17A, 18C, 20A, 21A, 22A |
| First Partially Open State | Retracted length LR (Non-Default length/LN) | Open | Closed | FIGS. 3F, 16B, 21B, 22B |
| Second Partially Open State | Extended length LE (Non-Default length/LN) | Closed | Open | FIGS. 3I, 17B, 21C, 22C |
| Closed State | Default length LD | Closed | Closed | FIGS. 2A, 3C, 14A, 15C, 18A, 20C |

As indicated schematically in FIGS. 2C, 3A-3C, 15A-15C, 20A-20C, 21A and 22A, when cover T is in the open state both doors DA and DB may be moved together from the open position to the closed position (e.g. by manual operation of a vehicle operator) with link LK retained at the default length LD to put the cover into the closed state (with both doors in the closed position). See also FIG. 11 and TABLE B.

As indicated schematically in FIGS. 3D-3F, 16A-16B, 21B and 22B, when cover T is in the open state door DA may be moved independently from the open position to the closed position (e.g. by manual operation of a vehicle operator) to put the cover into a first partially open state with door DA in the open position and door DB in the closed position with link LK in a non-default length shown as retracted length LR (e.g. by relative movement of link members LM and disengagement of the detent mechanism DM on the link LK). See also FIG. 11 and TABLE B. As indicated schematically in the FIGURES and TABLE B, the cover may be transitioned from the first partially open state to the closed state by movement of door DB from the open position to the closed position; link LK may then be returned from the retracted length LR to the default length LD with re-engagement of detent mechanism DM. See FIGS. 2A, 18A and 19 and TABLE B.

As indicated schematically in FIGS. 3G-3I, 17A-17B, 21C and 22C, when cover T is in the open state door DB may be moved independently from the open position to the closed position (e.g. by manual operation of a vehicle occupant) to put the cover into a second partially open state with door DB in the open position and door DA in the closed position with link LK in a non-default length shown as extended length LE (e.g. by relative movement of link members LM and disengagement of the detent mechanism DM on the link LK). See also FIG. 11 and TABLE B. As indicated schematically in the FIGURES and TABLE B, the cover may be put from the second partially open state to the closed state by movement of door DA from the open position to the closed position (e.g. by manual operation of a vehicle occupant); link LK may be returned from extended length LE to default length LD with re-engagement of the detent mechanism DM. See FIGS. 2A, 18A and 19 and TABLE B.

According to an exemplary embodiment as shown schematically in FIGS. 2A-2D, 3A-3I, 11, 12, 13, 14A-14C, 15A-15C, 16A-16B, 17A-17B, 18A-18C, 19, 20A-20C, 21A-21C, 22A-22C, 23A-23B and 24A-24C, a vehicle interior component C/1000/2000 may comprise a base B/100/2100 providing a compartment, a cover T movable relative to the base comprising a first door DA/200/2200 movable between a closed position and an open position and a second door DB/300/2300 movable between a closed position and an open position and a link LK/400/2400 comprising a length and configured to couple the first door and the second door.

According to an exemplary embodiment as shown schematically in FIGS. 11, 12, 13, 18A-18C and 19 and TABLE B, a length of link LK for cover T may comprise an effective length between a coupling CL to first door DA and a coupling CL to second door DB. As shown schematically in FIGS. 18A-18C, 19, 21A and 22A and TABLE B, the effective length of link LK may comprise a default length LD to couple movement of first door DA with movement of second door DB. As shown schematically in FIGS. 21B-21C and 22B-22C and TABLE B, the effective length of link LK may comprise a non-default length shown as an extended length LE when first door DA is moved independently of second door DB; the effective length of link LK may comprise a non-default length shown as a retracted length LR when second door DB is moved independently of first door DA. As shown schematically in FIGS. 19, 21A-21C and 22A-22C and TABLE B, the non-default length of the link may comprise an extended length LE longer than the default length; the non-default length of the link may comprise a retracted length LR shorter than the default length.

As shown schematically in FIGS. 14A-14C, 15A-15C, 16A-16B and 17A-17B and TABLE B, movement of the cover relative to the base may comprise (1) an open state with the first door in the open position and the second door in the open position and (2) a first partially open state with the first door in the open position and the second door in the closed position and (3) a second partially open state with the first door in the closed position and the second door in the open position and (4) a closed state with the first door in the closed position and the second door in the closed position. See also FIGS. 2A-21, 18A-18C, 20A-20C and 21A-21C. As shown schematically in FIGS. 11, 12, 18A and 19 and TABLE B, the effective length of the link may be the default length when the cover is in the closed state. As shown schematically in FIGS. 11, 12, 18C, 19, 21A and 22A, the effective length of the link may be the default length when the cover is in the open state. As shown schematically in FIGS. 21B and 22B, the effective length of the link may comprise a retracted length LR when the cover is in the first partially open state. As shown schematically in FIGS. 21C and 22C, the effective length of the link may comprise an extended length LE when the cover is in the second partially open state.

According to an exemplary embodiment as shown schematically in FIGS. 11, 12, 13, 18A-18C, 19, 20A-20C, 21A-21C and 22A-22C, component C may comprise a link mechanism comprising link LK; the link mechanism may comprise a detent mechanism DM configured to retain the default length of link LK. According to an exemplary embodiment as shown schematically in FIGS. 11, 12, 13 and 18A-18C, the component may comprise a spring arrangement SP configured to move cover T from the closed state to the open state; the spring arrangement may comprise a first spring for first door DA and a second spring for second door DB.

According to an exemplary embodiment as shown schematically in FIGS. 11, 12, 13, 14A-14C, 15A-15C, 16A-16B, 17A-17B, 21A-21C, 22A-22C, 23A-23B and 24A-24C, link LK may comprise a first member LM/410/2410 and a second member LM/420/2420 movable relative to the first member. As shown schematically in FIGS. 21C and 22C, second member LM may be configured to extend relative to first member LM. As shown schematically in FIGS. 21B and 22B, second member LM may be configured to retract relative to first member LM. As shown schematically in FIGS. 11, 12, 13, 19 and 22A-22C, the component may comprise a link mechanism comprising the link; the link mechanism may comprise a mechanism such as a detent mechanism DM comprising a recess 422/2422 and a protrusion 412/2412; the link mechanism may comprise an indentation on the link; the link mechanism may comprise a notch shown as recess 422/2422 and a projection shown as protrusion 412/2412. As shown schematically in FIGS. 19 and 22A, detent mechanism DM may be engaged with the projection seated in the notch when the effective length of the link is the default length LD.

As shown schematically in FIGS. 11, 12, 13, 19 and 22A-22C, link LK may comprise a first member LM/410/2410 and a second member LM/420/2420 movable relative to the first member; the notch may be on the first member and the projection may be on the second member. See also FIGS. 23A-23B and 24A-24C. The link may comprise a first member LM/410/2410 and a second member LM/420/2420 movable relative to the first member; the first member may comprise a notch shown as recess 422/2422 and the second member may comprise a projection shown as protrusion 412/2412. As indicated schematically in FIGS. 21B-21C and 22B-22C and TABLE B, the projection may be out of the notch when the first door moves relative to the second door; the projection may be configured to move out of the notch to facilitate relative movement of the first door and the second door. As shown schematically in FIGS. 18A-18C, 19, 21A and 22A, the projection may be seated in the notch when the effective length of the link is the default length. As indicated schematically in FIGS. 21B-21C, 22B-22C, the projection may be unseated from the notch when the effective length of the link is extended to an extended length LE; link LK may be flexed so that the projection is unseated from the notch when the effective length of the link is extended to an extended length LE; the projection may be unseated from the notch when the effective length of the link is retracted to a retracted length LR; the link may be flexed so that the projection is unseated from the notch when the effective length of the link is retracted to a retracted length LR.

According to an exemplary embodiment as shown schematically in FIGS. 11, 12 and 13, link LK may comprise a first member LM and a second member LM. See also FIGS. 19 and 22A-22C. The first member may be a flexible member; the second member may be a flexible member. As shown schematically in FIGS. 12 and 13, the link may comprise a stiffener SF/430/2430; the stiffener may comprise a spring; the spring may comprise a bar.

As shown schematically in FIG. 11, first door DA may be coupled to the base at a first pivot joint PJ and second door DB may be coupled to the base at a second pivot joint PJ; the link mechanism with link LK may comprise a connection to the first door offset from the first pivot joint and a connection to the second door offset from the second pivot joint. As indicated schematically in FIGS. 11, 12 and 13, the link may comprise a first member LM/410/2410 and a second member LM/420/2420 movable relative to the first member; the second member may be configured to slide relative to the first member. See also FIGS. 18A-18C, 19, 21A-21C, 22A-22C, 23A-23B and 24A-24C. As shown schematically in FIGS. 12 and 13, the component may comprise a link mechanism; the link mechanism may comprise a spring mechanism SM with a wire spring shown as stiffener SF/430/2430; the wire spring may be configured to stiffen the link; the link may comprise a first member LM/410/2410 and a second member LM/420/2420 movable relative to the first member; the first member may be configured to flex relative to the second member; the link may comprise a first member LM/410/2410 and a second member LM/420/2420 movable relative to the first member; the second member may be configured to flex relative to the first member. See also FIGS. 18A-18C, 19, 21A-21C and 22A-22C.

According to an exemplary embodiment as shown schematically in FIGS. 12 and 13, the component may comprise a link mechanism comprising link LK; the link mechanism may comprise a cantilever arrangement. As shown schematically in FIGS. 12 and 13, the link mechanism of link LK may comprise a tab 416 and a retainer RT/418 configured to engage to retain the effective length of the link in the default length. See also FIGS. 18A-18C, 19, 21A and 22A. The tab and the retainer may be configured to disengage to allow the effective length of the link to move to a retracted length LR; the tab and the retainer may be configured to disengage to allow the effective length of the link to move to an extended length LE. See also FIGS. 21B-21C, 22B-22C. The link may be configured to flex at the tab and the retainer to disengage to allow the effective length of the link to be moved from the default length. The link may comprise a first member LM/410/2410 and a second member LM/420/2420 movable relative to the first member; the first member may comprise an arm and the second member may comprise an arm. As indicated schematically in FIGS. 21A-21C and 22A-22C and TABLE B, the link may be configured to couple movement of the first door from the closed position to the open position and the second door from the closed position to the open position and to decouple movement of the first door from the open position to the closed position and the second door from the open position to the closed position. See also FIGS. 23A-23B and 24A-24C.

According to an exemplary embodiment as shown schematically in FIGS. 2A-2D, 3A-3I, 11, 12, 13, 14A-14C, 15A-15C, 16A-16B, 17A-17B, 18A-18C, 19, 20A-20C, 21A-21C, 22A-22C. 23A-23B and 24A-24C, a vehicle interior component C/1000/2000 may comprise a base B/100/2100 providing a compartment, a cover T movable relative to the base comprising a first door DA/200/2200 movable between a closed position and an open position and a second door DB/300/2300 movable between a closed position and an open position and a link LK/400/2400 configured to couple the first door and the second door. The link may be configured to couple movement of the first door and the second door from the closed position to the open position and to decouple movement of the first door and the second door from the open position to the closed position. The link may comprise a first arm shown as first member LM/410/2410 and a second arm shown as second member LM/420/2420; one of the first arm and the second arm may comprise a depression shown as recess 422/2422 and the other of the first arm and the second arm may comprise a protrusion 412/2412; the protrusion may be configured to engage the depression to couple the first arm and the second arm. At least one of the first arm and the second arm may be configured to flex to disengage the protrusion and the depression to enable the first arm and the second arm to move relative to one another.

According to an exemplary embodiment as shown schematically in FIGS. 2A-2D, 3A-3I, 11, 12, 13, 14A-14C, 15A-15C, 16A-16B, 17A-17B, 18A-18C, 19, 20A-20C, 21A-21C, 22A-22C, 23A-23B and 24A-24C, a vehicle interior component C/1000/2000 may comprise a base B/100/2100 providing a compartment, a first door DA/200/2200 movable relative to the base between a closed position and an open position, a second door DB/300/2300 movable relative to the base between a closed position and an open position and a link LK/400/2400 coupled to the first door and the second door. As shown schematically in FIGS. 21A-21C and 22A-22C and TABLE B, the link may be configured for (a) a coupled state to couple movement of the first door and the second door and (b) a decoupled state to de-couple movement of the first door and the second door. See also FIGS. 23A-23B and 24A-24C. As shown schematically in FIGS. 12 and 13, link LK may comprise a first arm shown as first member LM/410/2410 and a second arm shown as second member LM/420/2420; the first arm may be coupled to the second arm to link movement of the first door and the second door; the first arm and the second arm may be configured to move relative to one another to de-couple movement of the first door and the second door. One of the first arm and the second arm may comprise a notch shown as recess 422/2422 and the other of the first arm and the second arm may comprise a projection shown as protrusion 412/2412; the projection may be configured to engage the notch to couple the first arm and the second arm; when an external force is applied to move the first door from the open position toward the closed position, at least one of the first arm and the second arm may be configured to flex to disengage the protrusion and the depression to enable the first arm and the second arm to move relative to one another.

According to an exemplary embodiment as shown schematically in FIGS. 2A-2D, 3A-3I, 11, 12, 13, 14A-14C, 15A-15C, 16A-16B, 17A-17B, 18A-18C, 19, 20A-20C, 21A-21C, 22A-22C, 23A-23B and 24A-24C, a vehicle interior component C/1000/2000 may comprise a base B/100/2100 providing a compartment, a cover T movable relative to the base comprising a first door DA/200/2200 movable between a closed position and an open position and a second door DB/300/2300 movable between a closed position and an open position and a link LK/400/2400 coupled to the first door and the second door. As shown schematically in FIGS. 11 and 12, link LK may be coupled to the first door at a first feature such as at connection CL (e.g. pivot coupling) and coupled to the second door at a second feature such as at connection CL (e.g. pivot coupling); the link may be configured to substantially maintain a distance between the feature of the first door and the feature of the second door as the first door moves from the closed position of the first door to the open position of the first door and the second door moves from the closed position of the second door to the open position of the second door. See FIGS. 21A-21C. 22A-22C. 23A-23B and 24A-24C. As shown schematically in FIGS. 12 and 13, link LK may comprise a first arm shown as first member LM/410/2410 and a second arm shown as second member LM/420/2420; the first arm may be coupled to the second arm to maintain the distance between the feature of the first door and the feature of the second door as the first door moves from the closed position of the first door to the open position of the first door and the second door moves from the closed position of the second door to the open position of the second door. The first arm and the second arm may be configured to move relative to one another to de-couple movement of the first door and the second door; one of the first arm and the second arm may comprise a notch shown as recess 422/2422 and the other of the first arm and the second arm may comprise a projection shown as protrusion 412/2412; the projection may be configured to engage the notch to couple the first arm and the second arm. As indicated schematically in FIGS. 16A-16B and 17A-17B, when an external force is applied to move the first door from the open position toward the closed position, at least one of the first arm and the second arm may be configured to flex to disengage the projection and the notch to enable the first arm and the second arm to move relative to one another. See also FIGS. 21A-21C and 22A-22C and TABLE B.

According to an exemplary embodiment as shown schematically in FIGS. 2A-2D, 3A-3I, 11, 12, 13, 14A-14C, 15A-15C, 16A-16B, 17A-17B, 18A-18C, 19, 20A-20C, 21A-21C, 22A-22C, 23A-23B and 24A-24C, a vehicle interior component C/1000/2000 may comprise a base B/100/2100 providing a compartment, a cover T movable relative to the base comprising a first door DA/200/2200 movable between a closed position and an open position and a second door DB/300/2300 movable between a closed position and an open position and a link LK/400/2400 comprising an effective length. As shown schematically in FIGS. 21A-21C and 22A-22C and TABLE B, link LK may be configured to maintain the effective length to couple movement of first door DA and second door DB; the link may be configured to change the effective length to decouple movement of first door DA and second door DB. As shown schematically in FIGS. 11, 12, 13. 19 and 22A-22C, the component may comprise a link mechanism comprising link LK and a detent mechanism DM configured to engage to maintain the link in a default length LD and to disengage to allow the link to move to a non-default length; the link may comprise a first member LM/410/2410 and a second member LM/420/2420 movable relative to the first member; the non-default length may comprise movement of the second member LM relative to the first member LM to provide link LK in at least one of an extended length LE and/or a retracted length LR. Sec FIGS. 22A-22C.

Exemplary Embodiments—C

According to an exemplary embodiment as shown schematically in FIGS. 2A-2D and 3A-3I, vehicle interior component C/1000/2000 shown as a floor console FC may comprise a base B/100/2100, a first door DA and a second door DB. Vehicle interior component FC may be configured to be operated by application of an external force from an occupant shown as a hand. Base B may provide a compartment. First door DA may be movable relative to base B between a closed position as shown schematically in FIGS. 2A, 3C and 3I to at least partially cover the compartment and an open position as shown schematically in FIGS. 2D, 3A and 3D-3G to uncover the compartment. Second door DB may be movable relative to base B between a closed position as shown schematically in FIGS. 2A, 3C and 3F to at least partially cover the compartment and an open position as shown schematically in FIGS. 3A, 3D and 3G-3I. First door DA and second door DB may be configured for movement between (a) a first state with first door DA in the open position of first door DA and second door DB in the open position of second door DB as shown schematically in FIGS. 3A, 3D and 3G; (b) a second state with first door DA in the closed position of first door DA and second door DB in the open position of second door DB as shown schematically in FIG. 3I; (c) a third state with first door DA in the open position of first door DA and second door DB in the closed position of second door DB as shown schematically in FIG. 3F; (d) a fourth state with first door DA in the closed position of first door DA and second door DB in the closed position of second door DB as shown schematically in FIGS. 2A and 3C. First door DA may be configured to remain in the open position as second door DB moves from the open position to the closed position as shown schematically in FIGS. 2D, 3D-3F. Second door DB may be configured to remain in the open position as first door DA moves from the open position to the closed position as shown schematically in FIGS. 3G-3I. Vehicle interior component FC may be configured for (a) a coupled state to couple movement of first door DA and second door DB as shown schematically in FIGS. 2A-2B and (b) a decoupled state to de-couple movement of first door DA and second door DB as shown schematically in FIGS. 2C, 2D, 3A-3I.

According to an exemplary embodiment as shown schematically in FIG. 12, vehicle interior component 1000 may comprise a base 100, a first door DA/200 and a second door DB/300. According to an exemplary embodiment, vehicle interior component 1000 may comprise a link LK/400. According to an exemplary embodiment, vehicle interior component 1000 may comprise a set of springs SP/500, an actuator or button BT/600 and a latch LT/700. Set of springs SP/500 may be configured to move first door DA/200 and second door DB/300 relative to base 100 between a closed position as shown schematically in FIG. 18A to at least partially cover the compartment and an open position as shown schematically in FIG. 18C to uncover the compartment. Button BT/600 may be configured to actuate latch LT/700 to move first door DA/200 and second door DB/300 relative to base 100 between a closed position as shown schematically in FIG. 18A to at least partially cover the compartment and an open position as shown schematically in FIG. 18C to uncover the compartment.

According to an exemplary embodiment as shown schematically in FIG. 12, base 100 may comprise a pivot or sleeve 104. First door DA/200 may comprise an attachment feature 214 and a pivot member 250. Second door DB/300 may comprise an attachment feature 314 and a pivot member 350.

According to an exemplary embodiment as shown schematically in FIG. 13, link LK/400 may comprise a first member LM/410 and a second member LM/420. One of first member LM/410 and second member LM/420 may comprise a projection 412, a feature or attachment feature 414, a tab 416 and a retainer RT/418. One of first member LM/410 and second member LM/420 may comprise a recess or notch 422 and a feature or attachment feature 424. Link LK/400 may comprise a spring or wire SF/430.

Figure 18A:
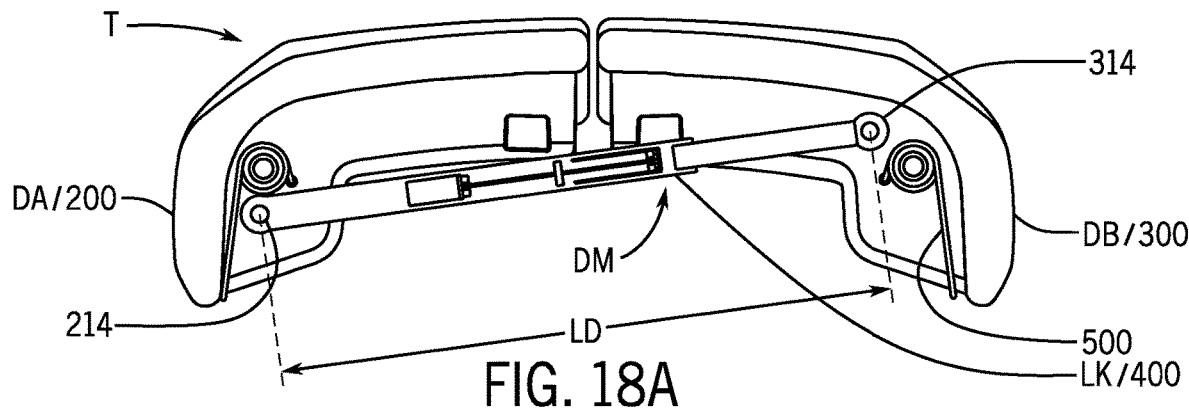
FIGS. 18A to 18C are schematic partial section views of a vehicle interior component according to an exemplary embodiment.
Figure 18B:
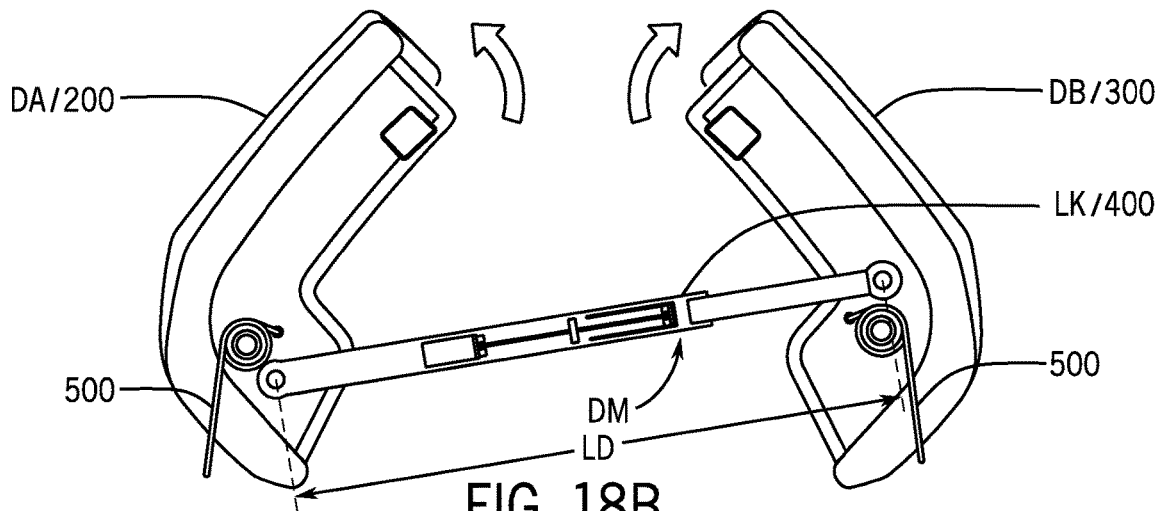
Figure 18C:
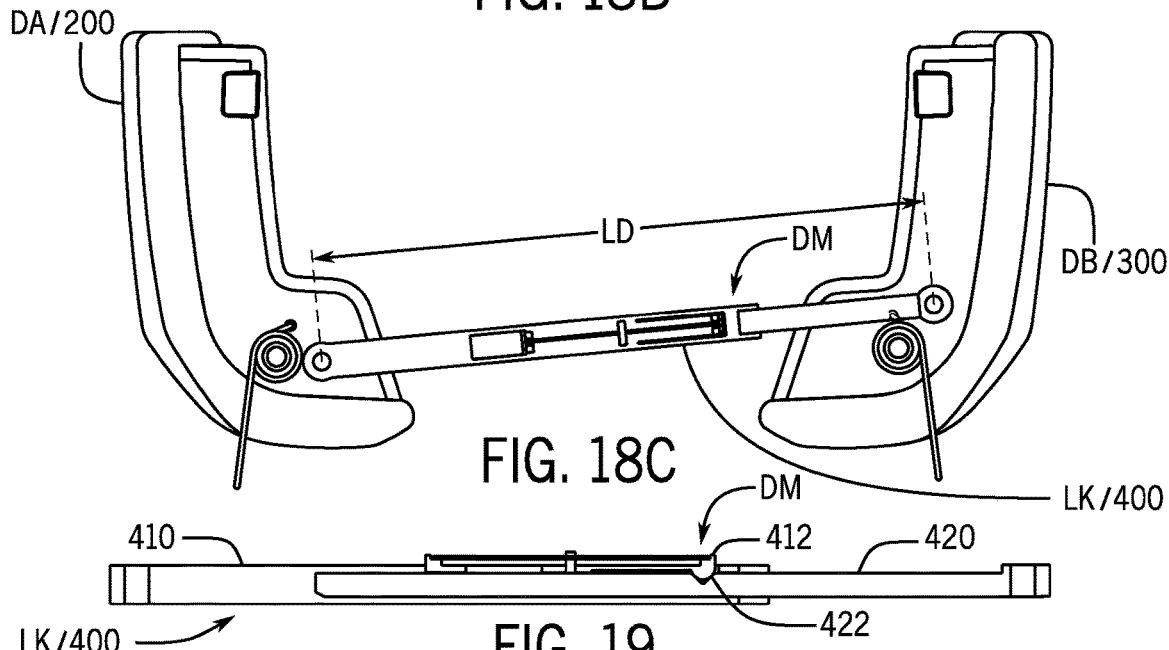
Figure 19:
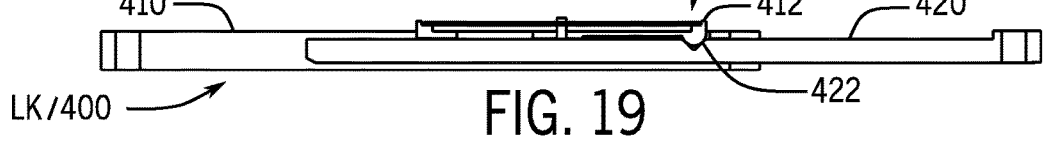
FIG. 19 is a schematic partial section view of a vehicle interior component according to an exemplary embodiment.
Figure 20A:
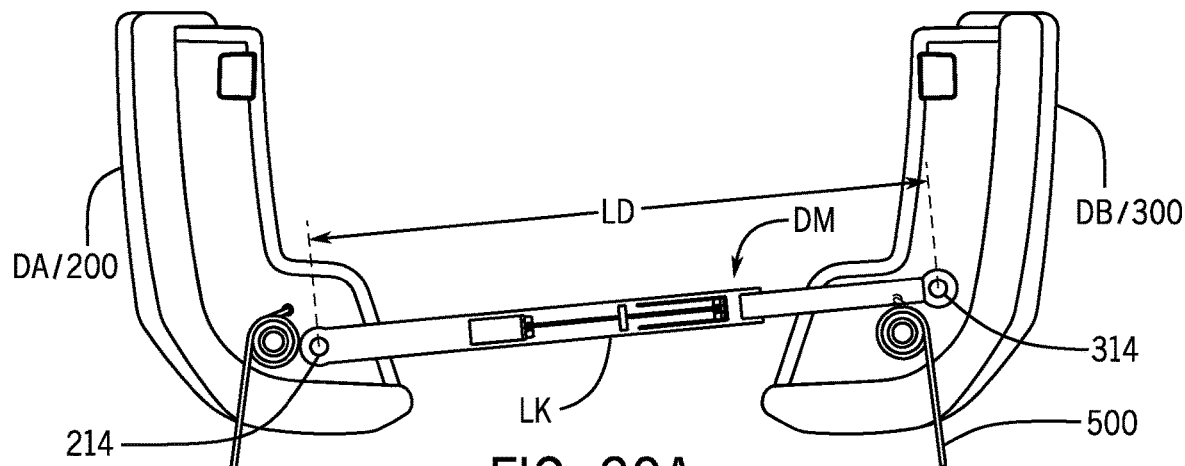
FIGS. 20A to 20C are schematic partial section views of a vehicle interior component according to an exemplary embodiment.
Figure 20B:
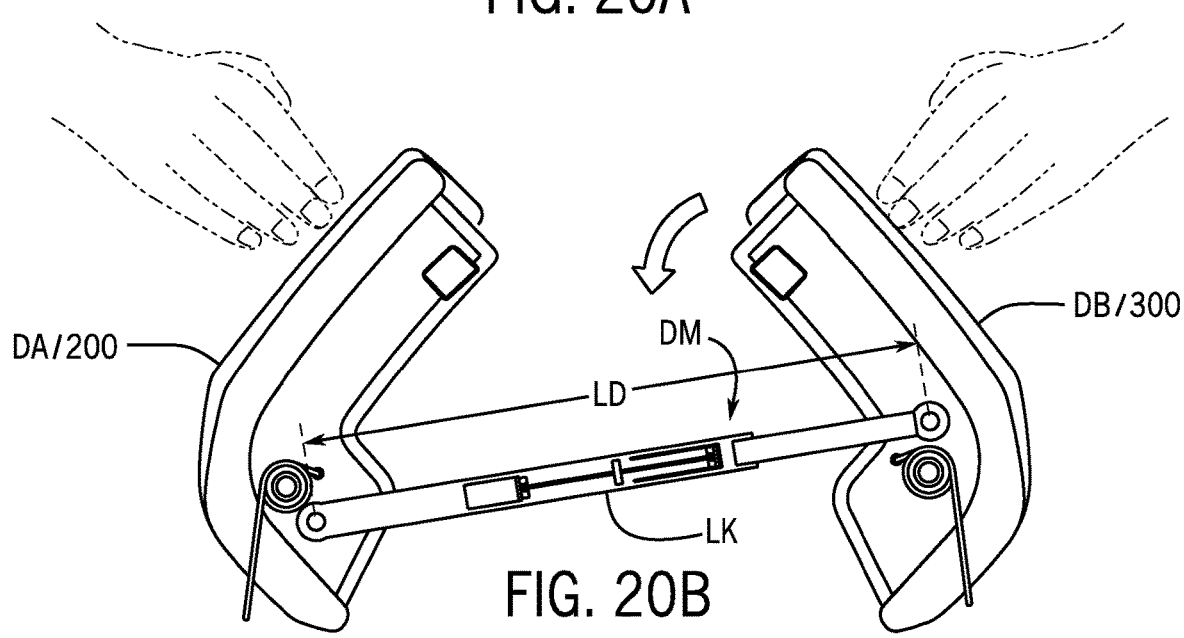
Figure 20C:
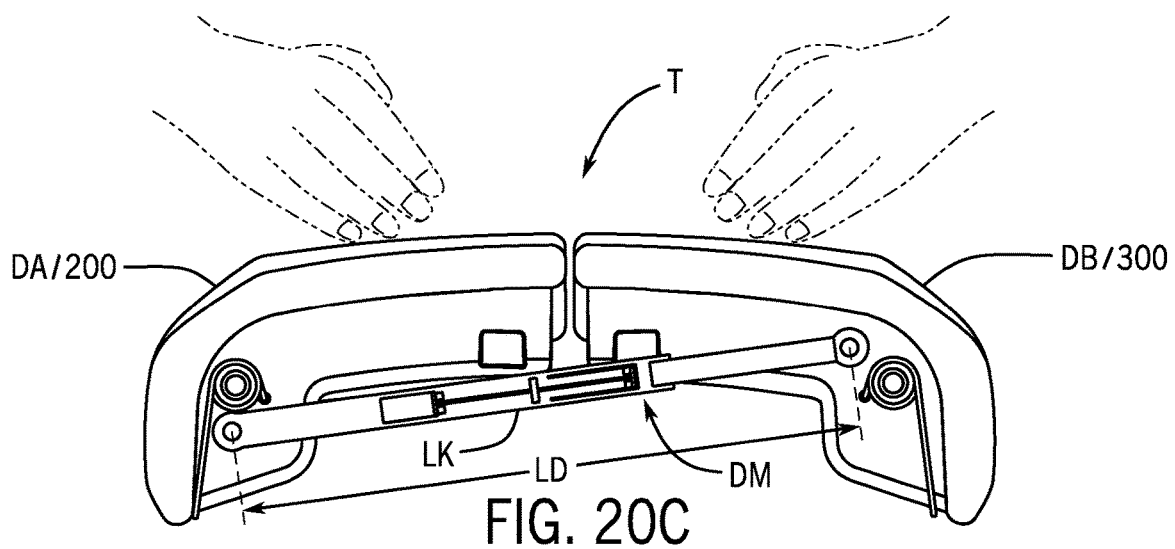

According to an exemplary embodiment as shown schematically in FIGS. 18A-18C, 19, 20A-20C, 21A-21C and 22A-22C, first door DA/200 may be movable relative to base 100 between a closed position as shown schematically in FIGS. 18A, 20C and 21C to at least partially cover a compartment and an open position as shown schematically in FIGS. 18C, 20A, 21A and 21B to uncover the compartment. Second door DB/300 may be movable relative to base 100 between a closed position as shown schematically in FIGS. 18A, 20C and 21B to at least partially cover a compartment and an open position as shown schematically in FIGS. 18C, 20A, 21A and 21C. First door DA/200 and second door DB/300 may be configured for movement between (a) a first state with first door DA/200 in an open position and second door DB/300 in an open position as shown schematically in FIGS. 18C, 20A and 21A; (b) a second state with first door DA/200 in a closed position and second door DB/300 in the open position as shown schematically in FIG. 21C; (c) a third state with first door DA/200 in the open position and second door DB/300 in a closed position as shown schematically in FIG. 21B; (d) a fourth state with first door DA/200 in the closed position and second door DB/300 in the closed position as shown schematically in FIGS. 18A and 20C. First door DA/200 may be configured to remain in the open position as second door DB/300 moves from the open position to the closed position as shown schematically in FIGS. 21A and 21B. Second door DB/300 may be configured to remain in the open position as first door DA/200 moves from the open position to the closed position as shown schematically in FIGS. 21A-21C. Vehicle interior component 1000 may be configured for (a) a coupled state to couple movement of first door DA/200 and second door DB/300 as shown schematically in FIGS. 18A-18C and (b) a decoupled state to de-couple movement of first door DA/200 and second door DB/300 as shown schematically in FIGS. 21A-21C.

According to an exemplary embodiment, link LK/400 of vehicle interior component 1000 may be configured to link movement of first door DA/200 and movement of second door DB/300 as shown schematically in FIGS. 18A-18C and 19. First member LM/410 may be configured to move relative to second member LM/420 to enable one of first door DA/200 and second door DB/300 to remain in the open position as the other of first door DA/200 and second door DB/300 moves from the open position to the closed position as shown schematically in FIGS. 21A-21C. One of first member LM/410 and second member LM/420 may comprise a recess 422 and the other of first member LM/410 and second member LM/420 may comprise a projection 412. Projection 412 may be configured to engage recess 422 to couple first member LM/410 and second member LM/420 as shown schematically in FIGS. 18A-18C and 19. At least one of first member LM/410 and second member LM/420 may be configured to flex to disengage projection 412 and recess 422 to enable first member LM/410 and second member LM/420 to move relative to one another as shown schematically in FIGS. 22B and 22C. According to an exemplary embodiment as shown schematically in FIGS. 20A-20C, first door DA/200 may move from the open position of first door DA/200 to the closed position of first door DA/200 in response to a first external force as second door DB/300 moves from the open position of second door DB/300 to the closed position of second door DB/300 in response to a second external force.

According to an exemplary embodiment as shown schematically in FIGS. 18A-18C, 19, 20A-20C, 21A-21C and 22A-22C, link LK/400 of vehicle interior component 1000 may couple to first door DA/200 at a first feature 214 and may couple to second door DB/300 at a second feature 314. Link LK/400 may be configured to substantially maintain a distance LD between feature 214 of first door DA/200 and feature 314 of second door DB/300 as first door DA/200 moves from a closed position to an open position and second door DB/300 moves from a closed position to an open position as shown schematically in FIGS. 18A-18C. First member LM/410 may be coupled to second member LM/420 to maintain distance LD between feature 214 of first door DA/200 and feature 314 of second door DB/300 as first door DA/200 moves from the closed position to the open position and second door DB/300 moves from the closed position to the open position as shown schematically in FIGS. 18A-18C and 19. First member LM/410 and second member LM/420 may be configured to move relative to one another to de-couple movement of first door DA/200 and second door DB/300 as shown schematically in FIGS. 21A-21C and 22A-22C. One of first member LM/410 and second member LM/420 may comprise recess 422 and the other of first member LM/410 and second member LM/420 may comprise projection 412. Projection 412 may be configured to engage recess 422 to couple first member LM/410 and second member LM/420 as shown schematically in FIGS. 18A-18C, 19 and 20A-20C. When an external force is applied to move first door DA/200 from the open position toward the closed position, at least one of first member LM/410 and second member LM/420 may be configured to flex to disengage projection 412 and recess 422 to enable first member LM/410 and second member LM/420 to move relative to one another as shown schematically in FIGS. 21A and 21C and 22A and 22C. As shown schematically in FIGS. 21A, 21C, 22A and 22C, link LK/400 may be configured to increase in length from LD to LE in response to movement of first door DA/200 from the open position toward the closed position to enable second door DB/300 to remain in the open position. As shown schematically in FIGS. 21A, 21B, 22A and 22B, link LK/400 may be configured to decrease in length from LD to LR in response to movement of second door DB/300 from the open position toward the closed position to enable first door DA/200 to remain in the open position.

According to an exemplary embodiment as shown schematically in FIGS. 18A-18C, 19, 20A-20C, 21A-21C and 22A-22C, link LK/400 may comprise a length LD. Link LK/400 may configured to maintain length LD to couple movement of first door DA/200 and second door DB/300 and link LK/400 may be configured to change from length LD to a length LE or a length LR to decouple movement of first door DA/200 and second door DB/300.

Figure 23A:
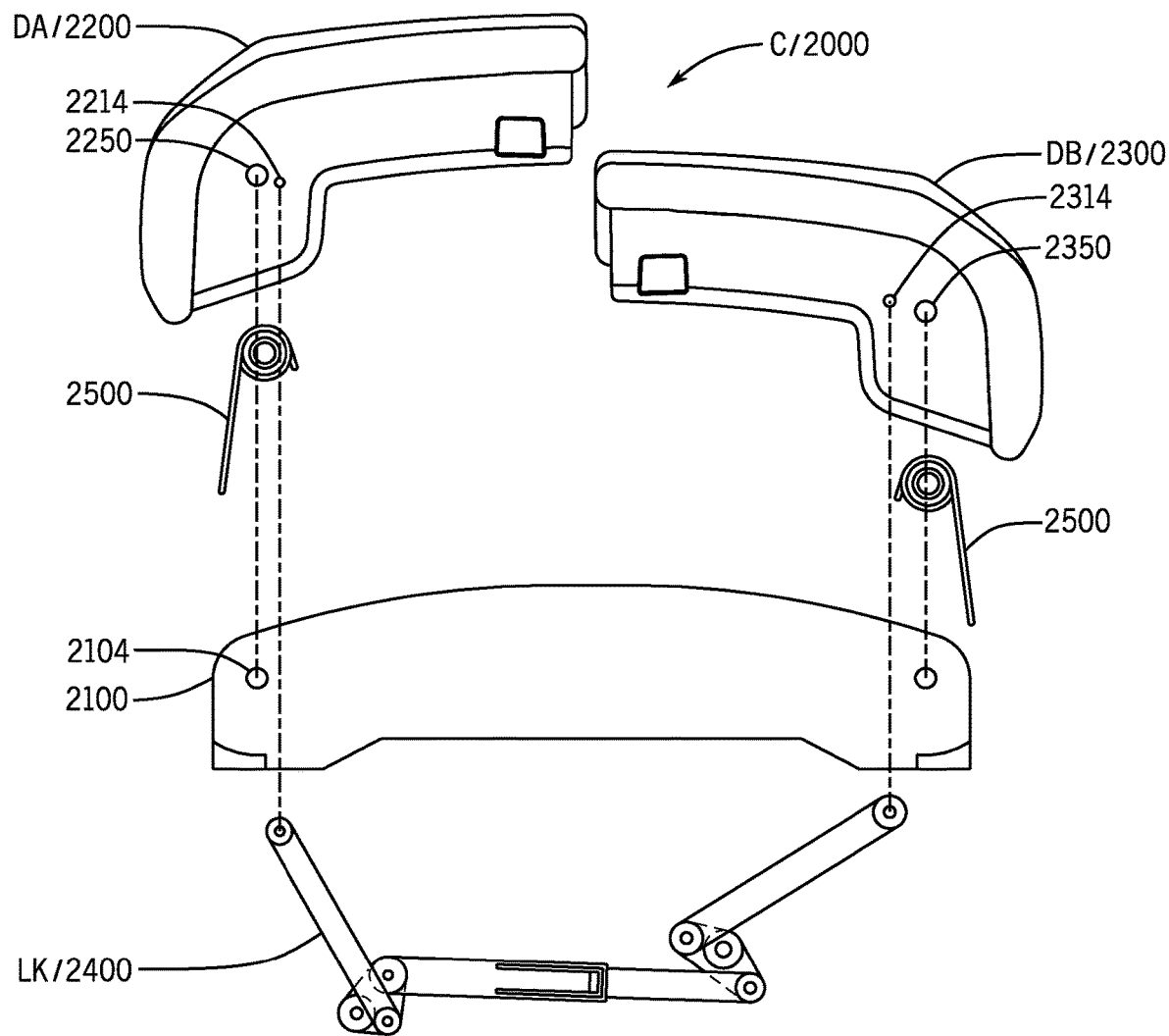
FIG. 23A is a schematic exploded partial section view of a vehicle interior component according to an exemplary embodiment.

According to an exemplary embodiment as shown schematically in FIG. 23A, a vehicle interior component 2000 may comprise a base 2100, a first door DA/2200 and a second door DB/2300. According to an exemplary embodiment, vehicle interior component 2000 may comprise a link LK/2400. According to an exemplary embodiment, vehicle interior component 2000 may comprise a set of springs SP/2500. Set of springs SP/2500 may be configured to move first door DA/2200 and second door DB/2300 relative to base 2100 between a closed position as shown schematically in FIG. 24A to at least partially cover the compartment and an open position as shown schematically in FIG. 24C to uncover the compartment.

According to an exemplary embodiment as shown schematically in FIG. 23A, base 2100 may comprise a pivot or sleeve 2104. First door DA/2200 may comprise an attachment feature 2214 and a pivot member 2250. Second door DB/2300 may comprise an attachment feature 2314 and a pivot member 2350.

Figure 23B:
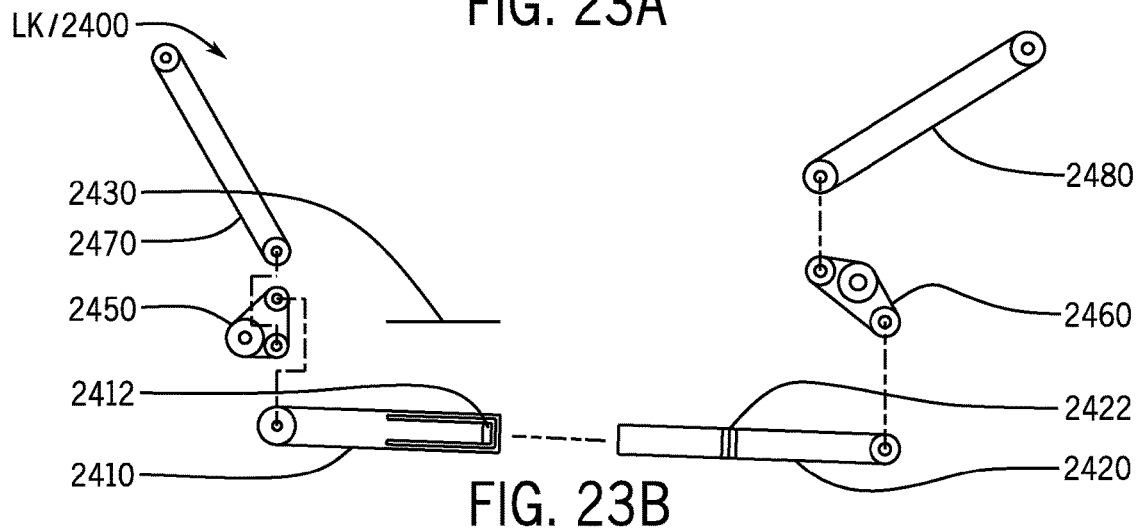
FIG. 23B is a schematic exploded partial section view of a vehicle interior component according to an exemplary embodiment.

According to an exemplary embodiment as shown schematically in FIG. 23B, link LK/2400 may comprise a first member LM/2410, a second member 2420, a third member 2470, a fourth member 2480 and a spring or wire SF/2430. First member LM/2410 may comprise a projection 2412. Second member 2420 may comprise a recess 2422. Link LK/2400 may comprise a coupling 2450 configured to link first member LM/2410 and third member 2470. Coupling 2450 may be configured to facilitate relative movement or relative rotation of first member LM/2410 and third member 2470. Link LK/2400 may comprise a coupling 2460 configured to link second member 2420 and fourth member 2480. Coupling 2460 may be configured to facilitate relative movement or relative rotation of second member 2420 and fourth member 2480.

Figure 24A:
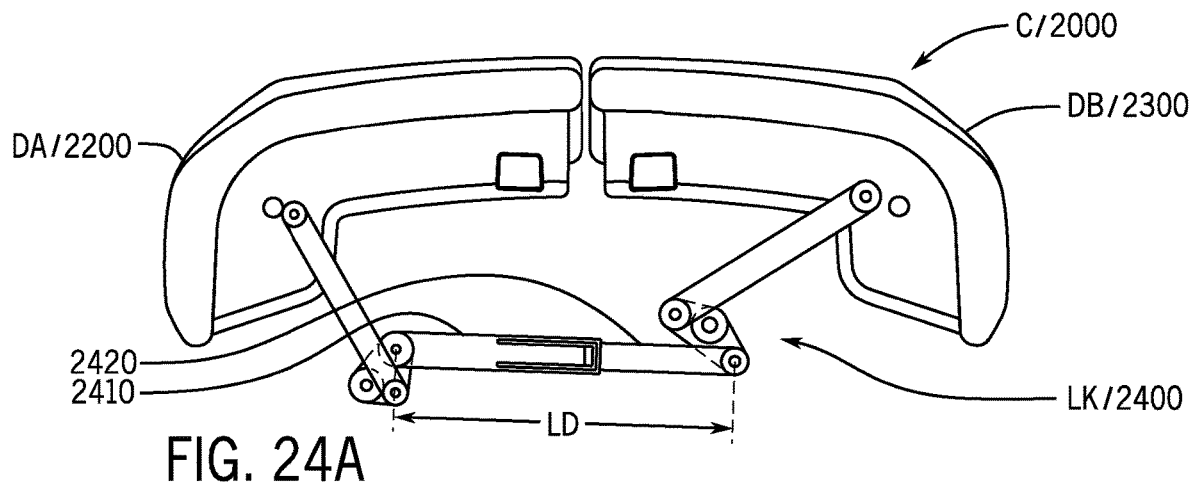
FIGS. 24A to 24C are schematic partial section views of a vehicle interior component according to an exemplary embodiment.
Figure 24B:
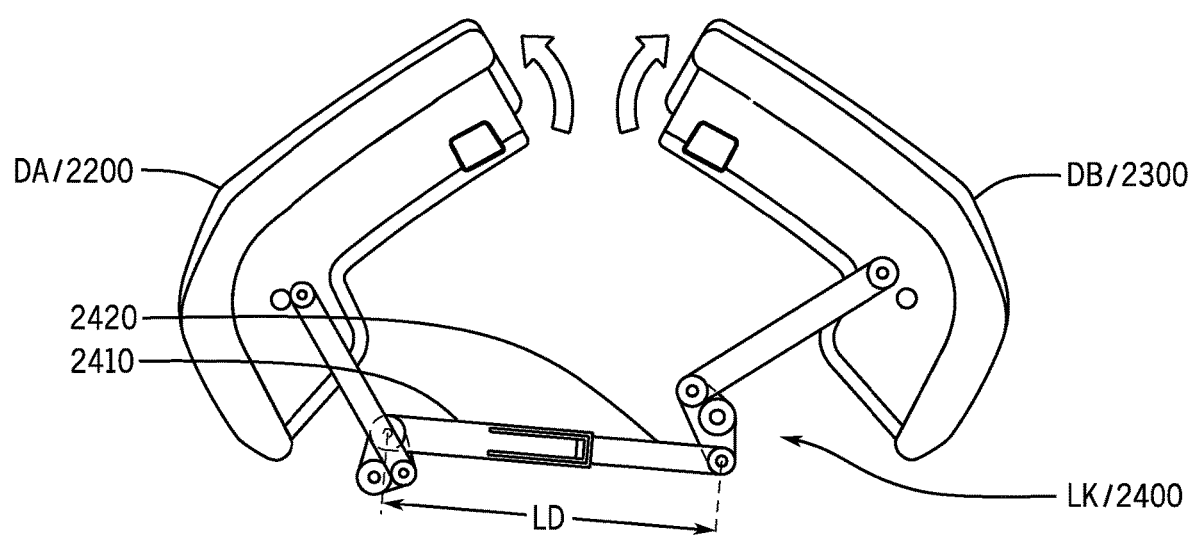
Figure 24C:
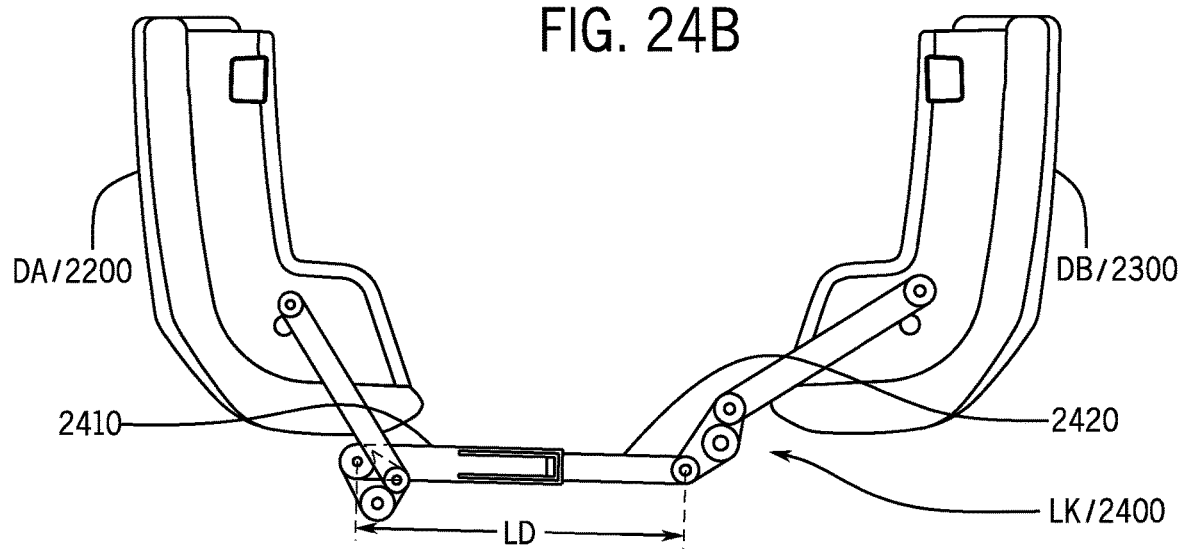

According to an exemplary embodiment as shown schematically in FIGS. 24A-24C, first door DA/2200 may be movable relative to base 2100 between a closed position as shown schematically in FIG. 24A to at least partially cover a compartment and an open position as shown schematically in FIG. 24C to uncover the compartment. Second door DB/2300 may be movable relative to base 2100 between a closed position as shown schematically in FIG. 24A to at least partially cover a compartment and an open position as shown schematically in FIG. 24C to uncover the compartment. First door DA/2200 and second door DB/2300 may be configured for movement between (a) a first state with first door DA/2200 in an open position and second door DB/2300 in an open position as shown schematically in FIG. 24C; (b) a second state with first door DA/2200 in a closed position and second door DB/2300 in the open position; (c) a third state with first door DA/2200 in the open position and second door DB/2300 in a closed position; (d) a fourth state with first door DA/2200 in the closed position and second door DB/2300 in the closed position as shown schematically in FIG. 24A. First door DA/2200 may be configured to remain in the open position as second door DB/2300 moves from the open position to the closed position. Second door DB/2300 may be configured to remain in the open position as first door DA/2200 moves from the open position to the closed position. Vehicle interior component 2000 may be configured for (a) a coupled state to couple movement of first door DA/2200 and second door DB/2300 as shown schematically in FIGS. 24A-24C and (b) a decoupled state to de-couple movement of first door DA/2200 and second door DB/2300.

According to an exemplary embodiment as shown schematically in FIGS. 23A-23B and 24A-24C, link LK/2400 of vehicle interior component 2000 may be configured to link movement of first door DA/2200 and movement of second door DB/2300 as shown schematically in FIGS. 24A-24C. First member LM/2410 may be configured to move relative to second member 2420 to enable one of first door DA/2200 and second door DB/2300 to remain in the open position as the other of first door DA/2200 and second door DB/2300 moves from the open position to the closed position. One of first member LM/2410 and second member 2420 may comprise a recess and the other of first member LM/2410 and second member 2420 may comprise a projection. The projection may be configured to engage the recess to couple first member LM/2410 and second member 2420 as shown schematically in FIGS. 24A-24C. At least one of first member LM/2410 and second member 2420 may be configured to flex to disengage the projection and the recess to enable first member LM/2410 and second member 2420 to move relative to one another. When an external force is applied to move first door DA/2200 from the open position toward the closed position, at least one of first member LM/2410 and second member 2420 may be configured to flex to disengage the projection and the recess to enable first member LM/2410 and second member 2420 to move relative to one another.

According to an exemplary embodiment as shown schematically in FIGS. 23A and 24A-24C, link LK/2400 of vehicle interior component 2000 may couple to first door DA/2200 at a first feature 2214 and may couple to second door DB/2300 at a second feature 2314. Link LK/2400 may be configured to substantially maintain a distance LD between feature 2214 of first door DA/2200 and feature 2314 of second door DB/2300 as first door DA/2200 moves from a closed position to an open position and second door DB/2300 moves from a closed position to an open position as shown schematically in FIGS. 24A-24C. First member LM/2410 and second member 2420 may be configured to move relative to one another to de-couple movement of first door DA/2200 and second door DB/2300.

Exemplary Embodiments—D

As indicated schematically according to an exemplary embodiment as shown schematically in FIGS. 2A-2D, 3A-3I, 11, 12, 13, 14A-14C, 15A-15C. 16A-16B, 17A-17B, 18A-18C, 19, 20A-20C, 21A-21C, 22A-22C. 23A-23B and 24A-24C, a vehicle interior component may comprise a base providing a compartment, a first door movable relative to the base between a closed position and an open position and a second door movable relative to the base between a closed position and an open position. The first door and the second door may be configured for movement between (a) a first state with the first door in the open position of the first door and the second door in the open position of the second door; (b) a second state with the first door in the closed position of the first door and the second door in the open position of the second door; (c) a third state with the first door in the open position of the first door and the second door in the closed position of the second door; (d) a fourth state with the first door in the closed position of the first door and the second door in the closed position of the second door. One of the first door and the second door may be configured to remain in the open position in response to movement of the other of the first door and the second door from the open position to the closed position. The vehicle interior component may comprise a link configured to link movement of the first door and movement of the second door from the closed position to the open position. The link may comprise a link assembly. The link may comprise a first member and a second member. The first member may be configured to move relative to the second member to enable one of the first door and the second door to remain in the open position in response to movement of the other of the first door and the second door from the open position to the closed position. One of the first member and the second member may comprise a recess and the other of the first member and the second member may comprise a projection. The projection may be configured to engage the recess to couple the first member and the second member. At least one of the first member and the second member may be configured to flex to disengage the projection and the recess to enable the first member and the second member to move relative to one another.

It is important to note that the present inventions (e.g. inventive concepts, etc.) have been described in the specification and/or illustrated in the FIGURES of the present patent document according to exemplary embodiments; the embodiments of the present inventions are presented by way of example only and are not intended as a limitation on the scope of the present inventions. The construction and/or arrangement of the elements of the inventive concepts embodied in the present inventions as described in the specification and/or illustrated in the FIGURES is illustrative only. Although exemplary embodiments of the present inventions have been described in detail in the present patent document, a person of ordinary skill in the art will readily appreciate that equivalents, modifications, variations, etc. of the subject matter of the exemplary embodiments and alternative embodiments are possible and contemplated as being within the scope of the present inventions; all such subject matter (e.g. modifications, variations, embodiments, combinations, equivalents, etc.) is intended to be included within the scope of the present inventions. It should also be noted that various/other modifications, variations, substitutions, equivalents, changes, omissions, etc. may be made in the configuration and/or arrangement of the exemplary embodiments (e.g. in concept, design, structure, apparatus, form, assembly, construction, means, function, system, process/method, steps, sequence of process/method steps, operation, operating conditions, performance, materials, composition, combination, etc.) without departing from the scope of the present inventions; all such subject matter (e.g. modifications, variations, embodiments, combinations, equivalents, etc.) is intended to be included within the scope of the present inventions. The scope of the present inventions is not intended to be limited to the subject matter (e.g. details, structure, functions, materials, acts, steps, sequence, system, result, etc.) described in the specification and/or illustrated in the FIGURES of the present patent document. It is contemplated that the claims of the present patent document will be construed properly to cover the complete scope of the subject matter of the present inventions (e.g. including any and all such modifications, variations, embodiments, combinations, equivalents, etc.); it is to be understood that the terminology used in the present patent document is for the purpose of providing a description of the subject matter of the exemplary embodiments rather than as a limitation on the scope of the present inventions.

It is also important to note that according to exemplary embodiments the present inventions may comprise conventional technology (e.g. as implemented and/or integrated in exemplary embodiments, modifications, variations, combinations, equivalents, etc.) or may comprise any other applicable technology (present and/or future) with suitability and/or capability to perform the functions and processes/operations described in the specification and/or illustrated in the FIGURES. All such technology (e.g. as implemented in embodiments, modifications, variations, combinations, equivalents, etc.) is considered to be within the scope of the present inventions of the present patent document.

What is claimed is:

1. A vehicle interior component comprising:
    (a) a base providing a compartment;
    (b) a cover movable relative to the base comprising a first door movable between a closed position and an open position and a second door movable between a closed position and an open position; and (c) a mechanism configured to couple the first door and the second door;
wherein the mechanism comprises a first member coupled to the first door and a second member coupled to the second door;
wherein the second member is configured (a) to extend relative to the first member and/or (b) to retract relative to the first member;
wherein the mechanism is configured to provide an engaged state to couple movement of the first door and the second door from the closed position to the open position;
wherein the mechanism is configured to provide a disengaged state to decouple movement of the first door and the second door from the open position to the closed position.

2. The component of claim 1 wherein the mechanism comprises a linkage comprising a length.

3. The component of claim 2 wherein wherein the length of the linkage comprises an effective length between a coupling to the first door and a coupling to the second door; wherein the effective length of the linkage comprises a default length to couple movement of the first door with movement of the second door.

4. The component of claim 1 wherein at least one of the first member and the second member is configured to flex relative to the other of the first member and the second member.

5. The component of claim 1 wherein the mechanism comprises a detent mechanism configured to couple the first member to the second member.

6. The component of claim 1 wherein at least one of the first member and the second member is a flexible member.

7. A vehicle interior component comprising:
(a) a base providing a compartment;
(b) a cover movable relative to the base comprising a first door movable between a closed position and an open position and a second door movable between a closed position and an open position; and
(c) a mechanism configured to couple the first door and the second door;
wherein the mechanism comprises a linkage comprising a length;
wherein the length of the linkage comprises an effective length between a coupling to the first door and a coupling to the second door;
wherein the effective length of the linkage comprises a default length to couple movement of the first door with movement of the second door;
wherein the effective length of the linkage comprises a non-default length to allow movement of the first door independent of movement of the second door.

8. The component of claim 7 wherein wherein the mechanism comprises a first member and a second member; wherein at least one of the first member and the second member is configured to flex to facilitate movement of one of the first door and the second door to the closed position with the other of the first door and the second door in the open position.

9. The component of claim 7 wherein the non-default length of the linkage comprises at least one of (a) an extended length longer than the default length; (b) a retracted length shorter than the default length.

10. The component of claim 7 wherein movement of the cover relative to the base comprises (1) an open state with the first door in the open position and the second door in the open position and (2) a first partially open state with the first door in the open position and the second door in the closed position and (3) a second partially open state with the first door in the closed position and the second door in the open position and (4) a closed state with the first door in the closed position and the second door in the closed position.

11. The component of claim 7 wherein the linkage comprises a first link member coupled to the first door and a second link member coupled to the second door.

12. The component of claim 11 wherein the mechanism comprises a detent mechanism configured to couple the first link member to the second link member.

13. A vehicle interior component comprising:
(a) a base providing a compartment;
(b) a cover movable relative to the base comprising a first door movable between a closed position and an open position and a second door movable between a closed position and an open position; and
(c) a mechanism configured to couple the first door and the second door;
wherein the mechanism comprises a first member coupled to the first door and a second member coupled to the second door;
wherein at least one of the first member and the second member is configured to flex to facilitate movement of one of the first door and the second door to the closed position with the other of the first door and the second door in the open position;
wherein the mechanism is configured to provide an engaged state to couple movement of the first door and the second door from the closed position to the open position;
wherein the mechanism is configured to provide a disengaged state to decouple movement of the first door and the second door from the open position to the closed position.

14. The component of claim 13 wherein the second member is configured (a) to extend relative to the first member and/or (b) to retract relative to the first member.

15. The component of claim 13 wherein the second member is configured to slide relative to the first member.

16. The component of claim 13 wherein the mechanism comprises a detent mechanism configured to couple the first member to the second member.

17. The component of claim 16 wherein the detent mechanism comprises at least one of (a) a recess and a protrusion; (b) a notch and a projection.

18. The component of claim 13 wherein the mechanism comprises a link mechanism comprising a linkage; wherein the linkage comprises an effective length between a coupling of the first member to the first door and a coupling of the second member to the second door; so that the effective length of the linkage comprises a default length to couple the first member to the second member.

19. The component of claim 13 wherein the mechanism comprises a linkage comprising a length.

20. The component of claim 19 wherein the length of the linkage comprises an effective length between a coupling to the first door and a coupling to the second door, wherein the effective length of the linkage comprises a default length to couple movement of the first door with movement of the second door.

* * * * *